United States Patent
Shibato et al.

(10) Patent No.: US 7,361,407 B2
(45) Date of Patent: *Apr. 22, 2008

(54) STAIN RESISTANT COATING COMPOSITIONS, METHODS OF COATING AND COATED ARTICLES

(75) Inventors: Kishio Shibato, Kanagawa (JP); Yoshinori Nakane, Kanagawa (JP); Shinichi Ikehara, Saitama (JP); Keisuke Kojima, Saitama (JP)

(73) Assignees: BASF Coatings Japan Ltd., Yokohama-shi (JP); Honda Giken Kogyo Kabushiki Kaisha, Tokyo (JP)

( * ) Notice: Subject to any disclaimer, the term of this patent is extended or adjusted under 35 U.S.C. 154(b) by 382 days.

This patent is subject to a terminal disclaimer.

(21) Appl. No.: 10/784,792

(22) Filed: Feb. 24, 2004

(65) Prior Publication Data

US 2004/0202873 A1    Oct. 14, 2004

Related U.S. Application Data

(63) Continuation of application No. 10/111,132, filed as application No. PCT/JP01/07205 on Aug. 23, 2001, now Pat. No. 6,797,391.

(30) Foreign Application Priority Data

Aug. 24, 2000  (JP) .............................. 2000-254327
Aug. 24, 2000  (JP) .............................. 2000-254342

(51) Int. Cl.
    *B32B 25/20*    (2006.01)
(52) U.S. Cl. ...................... 428/447; 427/387; 523/201; 523/205
(58) Field of Classification Search ................ 428/447; 427/387; 523/201, 205
    See application file for complete search history.

(56) References Cited

U.S. PATENT DOCUMENTS 5,698,628 A    12/1997  Masuda et al.
5,721,015 A    2/1998   Iwamura et al.
6,103,387 A    8/2000   Yamamoto et al.
6,316,572 B1 * 11/2001  Nambu et al. ................ 528/33
2003/0045626 A1 3/2003 Tamori et al.

FOREIGN PATENT DOCUMENTS

EP    85 10 09 A2      7/1998
EP    1 013 730 A1     6/2000
JP    6 145 453 A      5/1994
JP    7 173 429 A      7/1995
JP    7 292 041 A      11/1995
JP    10 88065 A       4/1998
JP    11 116 847 A     4/1999

OTHER PUBLICATIONS

Machine Translation of JP 07-173429 A, Jul. 1995, Tamai et al., obtained from the JPO website.
Machine Translation of JP 07-292041 A, Nov. 1995, Tamai et al., obtained from the JPO website.
Machine Translation of JP 10-088065 A, Apr. 1998, Nanbu et al., obtained from the JPO website.
Machine Translation of JP 11-116847 A, Apr. 1999, Nakamura et al., obtained from the JPO website.

* cited by examiner

*Primary Examiner*—Kuo-Liang Peng
(74) *Attorney, Agent, or Firm*—Rankin, Hill & Clark LLP

(57) ABSTRACT

A nonstaining coating composition which comprises as essential components (A) a specific aliphatic sulfonic acid compound or amine salt thereof, (B) a compound having per molecule at least one functional group selected among carboxyl, a carboxylic acid anhydride group, and a carboxyl group blocked with an alkyl vinyl ether, (C) a specific organosilicate and/or a condensate thereof, and (D) a resin having epoxy groups and/or alkoxysilyl groups in the molecule; and a method of finish coating. Also, a stain resistant coating composition which comprises (F') a specific modified resin and optionally (B) a compound having in the molecule at least one functional group selected from the group consisting of carboxyl group, carboxylic acid anhydride group and carboxyl group blocked with an alkylvinyl ether compound. They give a cured coating film which has nonstaining properties based on a high degree of hydrophilicity from immediately after the formation thereof and has satisfactory long-term weatherability, water resistance, and chemical resistance. The film can impart an excellent finish appearance to the article.

9 Claims, No Drawings

STAIN RESISTANT COATING COMPOSITIONS, METHODS OF COATING AND COATED ARTICLES

This is a Continuation of application Ser. No. 10/111,132 filed Apr. 23, 2002, which is a §371 National Stage Application of PCT Application No. PCT/JP01/07205 filed Aug. 23, 2001, now U.S. Pat. No. 6,797,391 B2; the disclosure of which is incorporated herein by reference.

FIELD OF TECHNOLOGY

The present invention relates to novel coating compositions, methods of coating and coated articles. More specifically, it relates to stain resistant coating compositions, which can give a paint film having excellent stain resistance, stain-removing property, weathering resistance, water resistance, chemical resistance, and appearance, particularly in automobile coating field, methods of coating and coated articles.

BACKGROUND TECHNOLOGY

In recent years, automobile users have required to maintain the beautiful appearance of a new automobile. For removing the stain of the inhibition factor, the automobile users have washed the automobile with detergent and water, wiped out water, and cleaned off or polished with water-repellent wax.

However, this work is a hard work which needs a few hours and therefore causes a lot of load to the users. Particularly, many waxes are water repellent, so that the stain is not removed because of large adhesive work in raining whether the stain is hydrophilic or hydrophobic. In addition, when the drop of water is dried, it becomes an unsightly stain in pattern of dots. Therefore, there are some cases that all pain maintenance by the users go for nothing in a day. The users require goods which decrease the load of the maintenance.

Also, the mind of environment protection increases recently. As the result, water pollution caused by the outflow of detergents and petroleum wax into rivers is feared. Some countries in Europe inhibit automobile washing at home. From such background, researches that the frequency of automobile washing by users is decreased by cleaning with raining and researches of coating or after-treatment agent which can clean the stained automobile without using the detergent have been conducted. For achieving the subject, it is suggested that it is good to decrease the adhesive work of the stain in water, that is, to increase the surface energy of the paint film for hydrophilic property (TOSO KOGAKU, vol. 31, No. 7, pages 260 to 320).

As concrete methods for giving hydrophilic property to the paint film, for example, international publication WO94/06870 discloses the coating composition comprising a specific organic coating composition and a specific organosilicate and/or a condensate thereof. The coating composition gives the paint film on which the contact angle of water is not more than 70 degree after acid treatment. And, international publication WO97/23572 discloses that the application of photocatalytic coating composition on the surface of the substrate, can give high degree of hydrophilic property.

However, the method of international publication WO94/06870 needs a long time for giving hydrophilic property to the paint film after formation of the paint film. The method can not obtain the user's satisfaction in automobile, which requires the manifestation of function immediately after buying. This point is different from structures. Since the silicate exists as pattern of spots in the inside of the paint film, there is a trend that the paint film becomes whitish by the difference of refractive index between the silicate and the binder or causes blushing phenomenon by water absorption of the silicate in the spot pattern when the paint film contacts water. It proves fatal to the automobile coating, which requires high quality appearance as goods and high durability. In addition, the lowest contact angle of water on the paint film treated with acid in Examples is 56 degree, and therefore, hydrophilic degree of the paint film is insufficient. In view of the maintenance-easy paint film having a contact angle of 30 degree or below, which can remove the hydrophobic stain such as carbon powder only by spray washing of automobile, the paint film is much lacking in hydrophilic degree.

Further, the method of international publication WO97/23572 can give hydrophilic property to the paint film in high degree by light irradiation, but is insufficient in view of uneven effect, because the vertical surface such as a door can not receive the light sufficiently and the effect may decrease or eliminate when the light irradiation is stopped in night or garage safekeeping. Since hydroxyl radical and superoxide ion generated in the photocatalytic reaction damages the organic paint film of the lower layer, the method is improper to the automobile which requires long term weathering resistance. The problem can be resolved by making regular maintenance for repainting, but the repainting maintenance is not desirable in cost because there is a possibility that maintenance cost of users is the same as prior maintenance cost or larger.

The present invention has an object to provide the coating composition which can give the paint film manifesting high degree of hydrophilic property, which has a function of cleaning the stained automobile not only by self washing with rain but also only by spray washing immediately after the formation of the paint film and further, having weathering resistance, water resistance and chemical resistance like that of prior automobile coating.

Another object of the present invention is to provide methods of coating which can give more excellent appearance to the finished article, and to provide coated articles prepared by utilizing the methods of coating.

Extensive investigations undertaken by the present inventors in order to develop the coating composition having preferable properties described above lead to a discovery that the objects can be achieved by using a stain resistant coating composition (called as the present first invention) comprising (A) a specific aliphatic sulfonic acid compound or a specific amine salt of aliphatic sulfonic acid compound, (B) a compound having in the molecule at least one functional group selected from the group consisting of carboxyl group, carboxylic acid anhydride group and carboxyl group blocked with an alkylvinyl ether compound, (C) a specific organosilicate and/or a condensate thereof, and (D) a resin having in the molecule one or more epoxy groups and/or alkoxy silyl groups, as indispensable components, and optionally (E) a dispersing component of at least one inorganic oxide sol selected from the group consisting of aluminum oxide sol, silica sol, zirconium oxide sol and antimony oxide sol and/or (F) a modified resin having a modified part derived from a specific organosilicate and/or a condensate thereof, and an acrylic resin structure part having in the molecule one or more hydroxyl groups, or both of one or more hydroxyl group and one or more epoxy groups, and a stain resistant coating composition (called as the present second invention) comprising a modified resin prepared by polymerizing a mixture of polymerizable monomers for an acrylic resin synthesis containing a hydroxyl group-containing radical polymerizable monomer or both of a hydroxyl group-containing radical polymerizable monomer and an epoxy group-containing radical polymerizable monomer, in the presence of a specific organosilicate and/or a condensate thereof, and optionally (B) a compound having in the molecule at least one functional group selected from the group consisting of carboxyl group, carboxylic acid anhydride group and carboxyl group blocked with an alkylvinyl ether compound, and/or (C) a specific organosilicate and/or a condensate thereof.

DISCLOSURE OF THE INVENTION

The present first invention provides a stain resistant coating composition which comprises (A) an aliphatic sulfonic acid compound or an amine salt of aliphatic sulfonic acid compound, (B) a compound having in the molecule at least one functional group selected from the group consisting of carboxyl group, carboxylic acid anhydride group and carboxyl group blocked with an alkylvinyl ether compound, (C) an organosilicate represented by formula (1):

  (1), wherein $R^1$ and $R^2$ are each hydrogen atom, an alkyl group having 1 to 10 carbon atoms or an aryl group having 1 to 10 carbon atoms and m is 0 or 1, and/or a condensate thereof, and (D) a resin having in the molecule one or more epoxy groups and/or alkoxy silyl groups, as indispensable components, and optionally (E) a dispersing component of at least one inorganic oxide sol selected from the group consisting of aluminum oxide sol, silica sol, zirconium oxide sol and antimony oxide sol and/or (F) a modified resin having a modified part derived from an organosilicate represented by formula (2):

  (2), wherein $R^3$ and $R^4$ are each hydrogen atom, an alkyl group having 1 to 10 carbon atoms or an aryl group having 1 to 10 carbon atoms and n is 0 or 1, and/or a condensate thereof, and an acrylic resin structure part having in the molecule one or more hydroxyl groups, or both of one or more hydroxyl group and one or more epoxy groups.

The present first invention provides the stain resistant coating composition as described above, wherein the aliphatic sulfonic acid compound of ingredient (A) has an alkyl group of 4 to 30 carbon atoms, and the content of ingredient (A) is in the range from 0.05 to 10 percents by weight based on the total amount of all nonvolatile matters of ingredients (A) through (F).

The present first invention provides the stain resistant coating composition as described above, wherein ingredient (B) has in the molecule two or more carboxyl groups and/or two or more carboxyl groups blocked with an alkylvinyl ether compound, and the content of ingredient (B) is in the range from 3 to 80 percents by weight based on the total amount of all nonvolatile matters of ingredients (A) through (F).

The present first invention provides the stain resistant coating composition as described above, wherein a weight average molecular weight of the organosilicate condensate of ingredient (C) is 500 to 10000, and the content of ingredient (C) is in the range from 0.1 to 30 percents by weight based on the total amount of all nonvolatile matters of ingredients (A) through (F).

The present first invention provides the stain resistant coating composition as described above, wherein ingredient (D) is an acrylic resin having in the molecule two or more epoxy groups, and the content of ingredient (D) is in the range from 3 to 80 percents by weight based on the total amount of all nonvolatile matters of ingredients (A) through (F).

The present first invention provides the stain resistant coating composition as described above, wherein the acrylic resin structure part in the modified resin of ingredient (F) has one or more organic groups represented by formula (3):

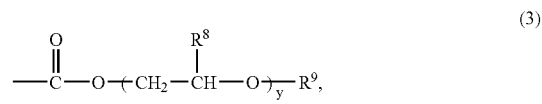  (3)

wherein $R^8$ and $R^9$ are each hydrogen atom or an alkyl group having 1 to 4 carbon atoms and y is an integer from 1 to 10.

The present first invention provides the stain resistant coating composition as described above, wherein the nonvolatile matter of the inorganic oxide sol of ingredient (E) is a composite having a structure of core/shell coated with an acrylic polymer, and the content of the nonvolatile matter of ingredient (E) is in the range from 1 to 100 parts by weight based on 100 parts by weight of the total amount of all nonvolatile matters of ingredients (A), (B), (C) and (D).

The present first invention provides the stain resistant coating composition as described above, wherein the weight average molecular weight of the organosilicate condensate used for the modified resin of ingredient (F) is 200 to 2000, and the content of the modified resin of ingredient (F) is in the range from 1 to 100 parts by weight based on 100 parts by weight of the total amount of all nonvolatile matters of ingredients (A), (B), (C) and (D).

The present invention provides a method of coating which comprises applying a top coating composition comprising a pigment and the stain resistant coating composition as described above on a coated article, wherein the content of the pigment is in the range from 0 to 200 parts by weight based on 100 parts by weight of the total amount of all nonvolatile matters of ingredients (A) through (F).

The present second invention provides a stain resistant coating composition, which comprises (F') a modified resin prepared by polymerizing a mixture of polymerizable monomers for an acrylic resin synthesis containing a hydroxyl group-containing radical polymerizable monomer or both of a hydroxyl group-containing radical polymerizable monomer and an epoxy group-containing radical polymerizable monomer, in the presence of an organosilicate represented by formula (2):

  (2), wherein $R^3$ and $R^4$ are each hydrogen atom, an alkyl group having 1 to 10 carbon atoms or an aryl group having 1 to 10 carbon atoms and n is 0 or 1, and/or a condensate thereof.

The present second invention provides a stain resistant coating composition as described above, wherein (B) a compound having in the molecule at least one functional group selected from the group consisting of carboxyl group, carboxylic acid anhydride group and carboxyl group blocked with an alkylvinyl ether compound is comprised.

The present second invention provides the stain resistant coating composition as described above, which comprises further an organosilicate represented by formula (1):

wherein $R^1$ and $R^2$ are each hydrogen atom, an alkyl group having 1 to 10 carbon atoms or an aryl group having 1 to 10 carbon atoms and m is 0 or 1, and/or a condensate thereof.

The present second invention provides the stain resistant coating composition as described above, wherein the content of ingredient (F') is in the range from 3 to 80 percents by weight, the content of ingredient (B) is in the range from 3 to 80 percents by weight, and the content of ingredient (C) is in the range from 0.1 to 30 percents by weight.

The present second invention provides the stain resistant coating composition as described above, wherein the acrylic resin structure part in the modified resin of ingredient (F') has one or more organic groups represented by formula (3):

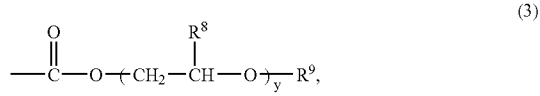

wherein $R^8$ and $R^9$ are each hydrogen atom or an alkyl group having 1 to 4 carbon atoms and y is an integer from 1 to 10.

The present second invention provides a method of coating which comprises applying a top coating composition comprising a pigment and the stain resistant coating composition as described above on a coated article, wherein the content of the pigment is in the range from 0 to 200 parts by weight based on 100 parts by weight of the total amount of all nonvolatile matters of ingredients (F'), (B) and (C).

The present invention provides a method of coating a substrate with a multilayer paint film which comprises by applying a colored film forming composition on the substrate to form a base coat, followed by applying a clear film forming composition on the base coat to form a clear top coat, wherein the top coat clear film forming composition alone or both of the top coat clear film forming composition and the colored film forming composition comprises any one of coating compositions as described above.

The present invention provides a method of coating which comprises applying a colored base coating composition on a substrate, followed applying an under clear coating composition on the uncured base coat, and baking the base coat and the under clear coat, and then applying an over coat clear coating composition on the under clear coat and baking the over clear coat, wherein the under clear coating composition is selected from the group consisting of an acrylic resin/aminoplast resin coating composition, an acrylic resin/urethane resin hardner coating composition and an acrylic resin/aminoplast resin/urethane resin hardner coating composition, and the over coat clear coating composition comprises any one of the coating compositions as described above.

The present invention provides the method of coating as described above, which comprises applying a colored base coating composition on a substrate, followed applying an under clear coating composition on the uncured base coat, and baking the base coat and the under clear coat, and then applying an over coat clear coating composition on the under clear coat and baking the over clear coat, wherein the under clear coating composition comprises a resin mixture of 40 to 80 percents by weight of (a) a hydroxyl group-containing and epoxy group-containing acrylic resin, 0 to 60 percents by weight of (b) an aminoplast resin and 0 to 60 percents by weight of (c) an urethane resin hardner as main component.

The present invention provides a coated article applied by the method of coating as described above.

PREFERABLE EMBODIMENT FOR PRACTICING THE INVENTION

In the stain resistant coating composition of the present first invention, the aliphatic sulfonic acid compound or the amine salt of aliphatic sulfonic acid compound of ingredient (A) is required to obtain high degree of hydrophilic property immediately after paint film formation, and mainly utilized to promote a hydrolysis reaction of the organosilicate and/or a condensate thereof of ingredient (C). In the more concrete, the aliphatic sulfonic acid compound is preferably a compound having an alkyl group of 4 to 30 carbon atoms. The aliphatic sulfonic acid compound can have one or more alkyl groups but is preferable the compound having one or two alkyl groups. The number of total carbon atom in one or more alkyl groups is preferably 8 to 26, more preferably 10 to 24. The alkyl group is preferably a saturated alkyl group, but can be an unsaturated alkyl group. Examples of the aliphatic sulfonic acid compound include compounds obtained by ion-exchanging anionic aliphatic surface active agents. Methods of ion-exchange include a method of ion-exchange by using an ion-exchange resin, and a method of

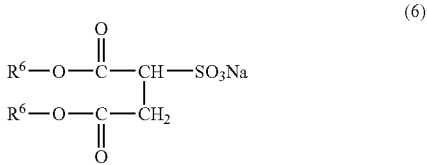

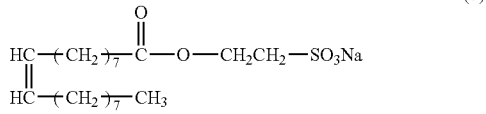

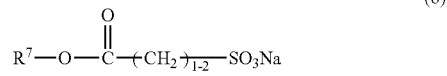

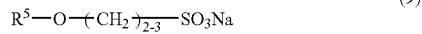

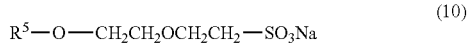

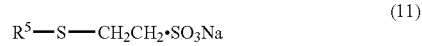

of 13 to 30 carbon atoms.

The aliphatic sulfonic acid compound obtained by the method described above can be utilized as it is, or as the form of an amine salt. The amine salt includes a salt obtained by neutralizing the aliphatic sulfonic acid compound obtained by the method described above with an amine. Examples of the amine in the amine salt of the aliphatic sulfonic acid compound include, for example, methyl amine, ethyl amine, propyl amine, isopropyl amine, butyl amine, hexyl amine, octyl amine, dimethyl amine, diethyl amine, dipropyl amine, dibutyl amine, dihexyl amine, dioctyl amine, trimethyl amine, triethyl amine, tripropyl amine, tributyl amine, monoethanol amine, diethanol amine, triethanol amine, isopropanol amine, diisopropanol amine, triisopropanol amine, dimethylethanol amine, methyldiethanol amine, pyridine, molpholine, N-methyl molpholine, aniline, dimethyl aniline, dimethyl benzyl amine, tetramethyl butane diamine, and dimethyl lauryl amine.

The content of the aliphatic sulfonic acid compound or the amine salt of the aliphatic sulfonic acid compound of ingredient (A) is preferably in the range from 0.05 to 10 percents by weight, more preferably in the range from 0.1 to 5 percents by weight, most preferably in the range from 0.1 to 3 percents by weight based on the total amount of all nonvolatile matters of ingredients (A) through (F). When the content of ingredient (A) is less than 0.1 percent by weight, it is not preferable because it is difficult to obtain high degree of hydrophilic property immediately after the formation of the paint film. When the content of ingredient (A) is more than 10 percents by weight, it is not preferable because the high degree of water resistance of the cured paint film decreases.

Ingredient (B) used in the stain resistant coating composition of the present first invention is a compound which causes a thermosetting reaction with ingredient (D), and is a compound having in the molecule at least one functional group selected from the group consisting of carboxyl group, carboxylic acid anhydride group and carboxyl group blocked with an alkylvinyl ether compound (may be called as the curing agent, hereafter). As examples of the curing agent, compounds having in the molecule one or more carboxyl groups include, for example, succinic acid, malonic acid, glutaric acid, adipic acid, azelaic acid, sebacic acid, decamethylenedicarboxylic acid, dimer acid, phthalic acid, maleic acid, trimellitic acid, pyromellitic acid, tetrahydrophthalic acid, hexahydrophthalic acid and methyl hexahydrophthalic acid. Other compounds having in the molecule one or more carboxyl groups include compounds prepared by ① half-esterification of a polyol having in the molecule one or more, preferably 2 to 50, hydroxyl groups and an acid anhydride, ② addition of a polyisocyanate compound having one or more, preferably 2 to 50 isocyanate groups in the molecule with a hydroxycarboxylic acid or an amino acid, ③ homopolymerization of a carboxyl group-containing radical polymerizable monomer or copolymerization of the radical polymerizable with other radical polymerizable monomers, or ④ preparation of polyester resin having terminal carboxyl groups. The compound having in the molecule one or more carboxylic acid anhydride groups includes, for example, compounds having in the molecule one carboxylic acid anhydride group such as succinic anhydride, phthalic anhydride, hexahydrophthalic anhydride, methylated hexahydrophthalic anhydride and tetrahydrophthalic anhydride, and copolymers of a radical polymerizable monomer having in the molecule a carboxylic acid anhydride such as maleic anhydride and itaconic anhydride and other radical polymerizable monomer. Further, the compound having one or more carboxyl groups blocked with an alkylvinyl ether compound includes compounds prepared by blocking the carboxylic acid group of the compound as described above having one or more carboxyl groups with an alkylvinyl ether compound. The alkylvinyl ether compound includes, for example, ethyl vinyl ether, n-propyl vinyl ether, isopropyl vinyl ether, n-butyl vinyl ether, isobutyl vinyl ether, t-butyl vinyl ether, pentyl vinyl ether, hexyl vinyl ether, isohexyl vinyl ether and cyclohexyl vinyl ether, 2,3-dihydrofuran, 3,4-dihydrofuran, 3,4-dihydro-2H-pyran, 3,4-dihydro-2-methoxy-2H-pyran, 3,4-dihydro-4,4-dimethyl-2H-pyran-2-on, 3,4-dihydro-2-ethoxy-2H-pyran.

In the stain resistant coating composition of the present first invention, the content of the curing agent of ingredient (B) is preferably in the range from 3 to 80 percents by weight, more preferably in the range from 10 to 70 percents by weight, most preferably in the range from 25 to 60 percents by weight based on the total amount of all nonvolatile matters of ingredients (A) through (F). When the content of ingredient (B) is less than 3 percents by weight, it is not preferable because solvent resistance of the finish cured paint film becomes insufficient. When the content of ingredient (B) is more than 80 percents by weight, it is not preferable because crack resistance of the cured paint film decreases.

Ingredient (C) used in the stain resistant coating composition of the present first invention is required to manifest high degree stain resistance in a short time after the curing of the paint film by floating on the surface of the paint film to form a concentrated layer, and is an organosilicate represented by formula (1) and/or a condensate thereof.

Preferable examples of the organosilicate represented by formula (1) include, for example, tetrahydroxysilane, tetramethoxysilane, tetraethoxysilane, tetrapropoxysilane, tetrabutoxysilane, tetraphenoxysilane, dimethoxydiethoxysilane, methyltrimethoxysilane, methyltriethoxysilane, phenyltrimethoxysilane, phenyltriethoxylsilane, butyltrimethoxysilane, hexyltrimethoxysilane, decyltrimethoxysilane, ethoxytrimethoxylsilane, propoxytrimethoxysilane, and butoxytrimethoxysilane.

The condensate of the organosilicate includes branched or linear condensates of one or more of the organosilicate represented by formula (1) and has a weight average molecular weight of preferably in the range form 500 to 10000, more preferably in the range from 500 to 5000. Commercial compounds of the condensate of the organosilicate include MKC SILICATE MS51, MS56, MS57, MS56S, MS56SB5, ES40, EMS31, BTS (all trade names, products of MITSUBISHI CHEMICAL CORPORATION), METHYL SILICATE 51, ETHYL SILICATE 40, ETHYL SILICATE 40T, ETHYL SILICATE 48 (all trade names, products of COLCOAT CO., LTD.), and ETHYL SILICATE 40, ETHYL SILICATE 45 (all trade names, products of TAMA CHEMICAL CO., LTD.), and condensates which further progress condensation degree of the organosilicate of the commercial compounds in the presence of the very small amount of water.

In the stain resistant coating composition of the present first invention, the content of the organosilicate and/or a condensate thereof of ingredient (C) is preferably in the range from 0.1 to 30 percents by weight, more preferably in the range from 0.2 to 20 percents by weight, most preferably in the range from 0.5 to 15 percents by weight based on the total amount of all nonvolatile matters of ingredients (A) through (F). When the content of ingredient (C) is less than 0.1 percents by weight, it is not preferable because the contact angle of water on the cured paint film does not decrease until the purposed stain resistance is met. When the content of ingredient (C) is more than 30 percents by weight, it is not preferable because water resistance of the cured paint film decreases.

Ingredient (D) used in the stain resistant coating composition of the present first invention is a resin having in the molecule one or more epoxy groups and/or alkoxy silyl groups and is ranked as main resin in the coating composition of the present first invention. Ingredient (D) administers to basic properties such as physical property and chemical property of the cured paint film and forms three dimensional crosslinked film by reacting with the curing agent of ingredient (B).

Preferable examples of the resin include an acrylic resin obtained by copolymerizing an epoxy group-containing radical polymerizable monomer and/or an alkoxy silyl group-containing radical polymerizable monomer, and other radical polymerizable monomer, and is more preferably a resin obtained by copolymerizing an epoxy group-containing radical polymerizable monomer and other radical polymerizable monomer. The epoxy group-containing radical polymerizable monomer includes, for example, glycidyl acrylate, glycidyl methacrylate, 3,4-epoxycyclohexylmethyl acrylate and 3,4-epoxycyclohexylmethyl methacrylate. The alkoxy silyl group-containing radical polymerizable monomer includes, for example, γ-methacryloxypropyl trimethoxysilane and γ-methacryloxypropyl methyl dimethoxysilane. The radical polymerizable monomers can be utilized in single kind or in mixture of two or more members.

The other radical polymerizable monomer includes, for example, methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, hexyl methacrylate, cyclohexyl methacrylate, 2-ethylhexyl methacrylate, octyl methacrylate, lauryl methacrylate, stearyl methacrylate, styrene, acrylonitrile, methacrylonitrile, acrylamide, methacrylamide, 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, 4-hydroxybutyl methacrylate, allyl alcohol, adduct of acrylic acid and versatic acid glycidyl ester, adduct of methacrylic acid and versatic acid glycidyl ester; ε-caprolactone adduct of 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate or 4-hydroxybutyl methacrylate; ethylene oxide and/or propylene oxide adduct of 2-hydroxyethyl acrylate, 2-hydroxypropyl acrylate, 3-hydroxypropyl acrylate, 4-hydroxybutyl acrylate, 2-hydroxyethyl methacrylate 2-hydroxypropyl methacrylate, 3-hydroxypropyl methacrylate or 4-hydroxybutyl methacrylate. The other radical polymerizable monomer can be utilized in single kind or in mixture of two or more members.

In the stain resistant coating composition of the present first invention, the content of the resin having in the molecule one or more epoxy groups and/or alkoxy silyl groups of ingredient (D) is preferably in the range from 3 to 80 percents by weight, more preferably in the range from 10 to 70 percents by weight, most preferably in the range from 15 to 60 percents by weight based on the total amount of all nonvolatile matters of ingredients (A) through (F). When the content of ingredient (D) is less than 3 percents by weight, it is not preferable because the effect for controlling physical properties of the cured paint film is not observed. When the content of ingredient (D) is more than 80 percents by weight, it is not preferable because purposed stain resistance of the cured paint film decreases.

In the stain resistant coating composition of the present first invention, the dispersing component of at least one inorganic oxide sol selected from the group consisting of aluminum oxide sol, silica sol, zirconium oxide sol and antimony oxide sol of ingredient (E) can be utilized in order to manifest stain resistance stably for a long time in the case of polishing the cured paint film.

Many of the inorganic oxide sols are generally supplied as aqueous dispersing system. But, the inorganic oxide sols can be utilized in the stain resistant coating composition of the present first invention by phase conversion into desired organic solvent. The used organic solvents include preferably alcohol solvents such as methanol, ethanol, n-propanol, isopropanol, n-butanol, isobutanol, pentanol, hexanol, 2-ethylhexanol, cyclohexanol; glycol ether solvents such as ethylene glycol monoethyl ether, ethylene glycol monobutyl ether, ethylene glycol monoethyl ether acetate, diethylene glycol monoethyl ether, diethylene glycol monobuthyl ether, propylene glycol monomethyl ether, propylene glycol monoethyl ether, propylene glycol monobuthyl ether and propylene glycol monomethyl ether acetate; and ketone solvents such as methylisobutyl ketone, methylamyl ketone and cyclohexanone.

The method of phase conversion into the organic solvent includes, for example, the method that a water-soluble organic solvent is added into the aqueous dispersing component and an operation of distillation and removal of water is repeated to proceed the phase conversion into the desired organic solvent.

The dispersing component of an silica sol can be produced by adding silicon tetrahalide into water, by adding acid into aqueous sodium silicate solution, by condensing an alkoxysilane compound in water or the like. Examples of commercial dispersing components are silica sols such as SNOWTEX-40, SNOWTEX-O, SNOWTEX-C, SNOWTEX-N, SNOWTEX-IPA-ST, SNOWTEX-EG-ST, SNOWTEX-XBA-ST and SNOWTEX-MIBK-ST (all trade names, products of Nissan chemical Industries LTD.), and CATALOID S-30H, CATALOID SI-30, CATALOID SN, CATALOID SA, OSCAL 1132, OSCAL 1232, and OSCAL 1332 (all trade names, products of Catalysts & Chemicals Ind. Co., LTD.), ADELITE AT-30, ADELITE AT-20N, ADELITE AT-20A and ADELITE AT-20Q (all trade names, products of Asahi Denka Kogyo K.K.), SILICADOL-30, SILICADOL-20A and SILICADOL-20B (all trade names, products of Nippon Chemical Industrial, Co., Ltd.); aluminum oxide sols such as ALUMINASOL-100, ALUMINASOL-200 and ALUMINASOL-520 (all trade names, products of Nissan Chemical Industries, Ltd.), ALUMINACLEARSOL, ALUMISOL-10, ALUMISOL-20, ALUMISOL SV-102, ALUMISOL-SH5, ALUMISOL-CSA55 and ALUMISOL-CSA11AD (all trade names, products of Kawaken Fine Chemicals Co., Ltd.); antimony oxide sols such as A-1550, A-2550, SUNCOLLOID ATL-130 and SUNCOLLOID AMT-130 (all trade names, products of Nissan Chemical Industries, Ltd.); zirconium oxide sols such as NZS-30A and NZS-30B (all trade names, products of Nissan Chemical Industries, LTD.).

The nonvolatile matter of the dispersing component of inorganic oxide sol is preferably a composite having a structure of core/shell coated with an acrylic polymer for existing homogeneously in the coating composition of the present first invention. The composite having a structure of core/shell coated with the acrylic polymer can be obtained by phase converting the dispersing component of inorganic oxide sol into the organic solvent, and then by coupling the surface of the inorganic oxide particulate with a silane coupling agent having one or more radical polymerizable groups, and followed by radical polymerizing the other acrylic monomer in the presence of the coupling-treated dispersing component of inorganic oxide sol.

The silane coupling agent having one or more radical polymerizable groups includes γ-methacryloxypropyl trimethoxysilane and γ-methacryloxypropyl methyldimethoxysilane. The amount of the silane coupling agent having one or more radical polymerizable groups is preferably in the range from 1 to 100 parts by weight, more preferably in the range from 1 to 80 parts by weight, most preferably in the range from 2 to 60 parts by weight based on 100 parts by weight of the micro particle of nonvolatile matter of inorganic oxide sol.

The other acrylic monomers include, for example, methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methylmethacrylate, ethylmethacrylate, n-propylmethacrylate, isopropyl methacrylate, n-butyl methacrylate, isobutyl methacrylate, sec-butyl methacrylate, hexyl methacrylate, cyclohexyl methacrylate, 2-ethylhexyl methacrylate, octyl methacrylate, lauryl methacrylate, stearyl methacrylate, styrene, acrylonitrile, methacrylonitrile, acrylamide, methacrylamide, 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, 4-hydroxybutyl methacrylate, allyl alcohol, adduct of acrylic acid and versatic acid glycidyl ester, adduct of methacrylic acid and versatic acid glycidyl ester; ε-caprolactone adduct of 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate or 4-hydroxybutyl methacrylate; ethylene oxide and/or propylene oxide adduct of 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate or 4-hydroxybutyl methacrylate; acrylic acid, methacrylic acid, itaconic acid, maleic acid, fumaric acid, glycidyl acrylate, glycidyl methacrylate, 3,4-epoxycyclohexylmethyl acrylate and 3,4-epoxycyclohexylmethyl methacrylate. The other radical polymerizable monomer can be utilized in single kind or in mixture of two or more members.

With respect to the ratio of core and shell in the composite having a structure of core/shell coated with an acrylic polymer, the content of the shell part of the acrylic polymer is preferably in the range from 10 to 1000 parts by weight, more preferably in the range from 30 to 800 parts by weight, most preferably in the range from 50 to 500 parts by weight based on 100 parts by weight of the micro particle of nonvolatile matter of inorganic oxide sol. When the content of the shell part of the acrylic polymer is less than 10 parts by weight, it is not preferable because it is difficult to exist the micro particle of inorganic oxide more homogeneously in the coating composition of the present first invention. When the content of the shell part of the acrylic polymer is more than 1000 parts by weight, it is not preferable because it is difficult to manifest stain resistance for a long time in the polished part of paint film.

The content of the nonvolatile matter of the inorganic oxide sol of ingredient (E) is preferably in the range from 1 to 100 parts by weight, more preferably in the range from 2 to 80 parts by weight, most preferably in the range from 5 to 60 parts by weight based on 100 parts by weight of all nonvolatile matters of ingredients (A) through (D). When the content of ingredient (E) is less than 1 parts by weight, it is not preferable because it is difficult to manifest stain resistance for a long time in the polished part of paint film. When the content of ingredient (E) is more than 100 parts by weight, it is not preferable because water resistance of the cured paint film decreases.

When higher degree of water resistance is required in the stain resistant coating composition of the present first invention, a modified resin having a modified part derived from the organosilicate represented by formula (2) and/or the condensate thereof and an acrylic resin structure part having in the molecule one or more hydroxyl group, or both of one or more hydroxyl group and one or more epoxy groups can be utilized as ingredient (F).

Preferable Examples of the organosilicate represented by formula (2) include, for example, tetrahydroxysilane, tetramethoxysilane, tetraethoxysilane, tetrapropoxysilane, tetrabutoxysilane, tetraphenoxysilane, dimethoxydiethoxysilane, methyltrimethoxysilane, methyltriethoxysilane, phenyltrimethoxysilane, phenyltriethoxysilane, butyltrimethoxysilane, hexyltrimethoxysilane, decyltrimethoxysilane, ethoxytrimethoxysilane, propoxytrimethoxysilane and butoxytrimethoxysilane.

The condensates of the organosilicate is branched or linear condensates of one or more of the organosilicate represented by formula (2) and has a weight average molecular weight preferably in the range form 200 to 2000, more preferably in the range from 300 to 1500. Commercial compounds of the condensate of the organosilicate include MKC silicate MS51, MS56, MS57, MS56S, MS56SB5, ES40, EMS31, BTS (all trade names, products of MITSUBISHI CHEMICAL CORPORATION), METHYL SILICATE 51, ETHYL SILICATE 40, ETHYL SILICATE 40T, ETHYL SILICATE 48 (all trade names, products of COLCOAT CO., LTD.), and ETHYL SILICATE 40, ETHYL SILICATE 45 (all trade names, products of TAMA CHEMICAL CO., LTD.).

The acrylic resin structure part having in the molecule one or more hydroxyl group, or both of one or more hydroxyl group and one or more epoxy groups can be prepared by normal radical copolymerizing a hydroxyl group-containing radical polymerizable monomer and other radical polymerizable monomer in an organic solvent, or by normal radical copolymerizing a hydroxyl group-containing radical polymerizable monomer, an epoxy group-containing radical polymerizable monomer and other radical polymerizable monomer in an organic solvent.

Examples of the hydroxyl group-containing radical polymerizable monomer include, for example, 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, 4-hydroxybutyl methacrylate, allyl alcohol, adduct of acrylic acid and versatic acid glycidyl ester, adduct of methacrylic acid and versatic acid glycidyl ester; ε-caprolactone adduct of 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate or 4-hydroxybutyl methacrylate; ethylene oxide and/or propylene oxide adduct of 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate or 4-hydroxybutyl methacrylate. The radical polymerizable monomer can be utilized in single kind or in mixture of two or more members.

Examples of the epoxy group-containing radical polymerizable monomer include, for example, glycidyl acrylate, glycidyl methacrylate, 3,4-epoxycyclohexylmethyl acrylate and 3,4-epoxycyclohexylmethyl methacrylate. The radical polymerizable monomer can be utilized in single kind or in mixture of two or more members.

The hydroxyl group-containing radical polymerizable monomer is used preferably in the range from 1 to 30 percents by weight, more preferably in the range from 1 to 15 percents by weight, most preferably in the range from 2 to 7 percents by weight in all monomers for constructing the acrylic resin structure part. When the content of the radical polymerizable monomer is less than 1 percent by weight, it is not preferable because water resistance of the finish cured paint film decreases. When the content of the radical polymerizable monomer is more than 30 percents by weight, it is not preferable because it is easy to be gelled in the modification reaction.

The epoxy group-containing radical polymerizable monomer is used preferably in the range from 0 to 70 percents by weight, more preferably in the range from 5 to 60 percents by weight, most preferably in the range from 10 to 50 percents by weight in all monomers for constructing the acrylic resin structure part. When the content of the radical polymerizable monomer is more than 70 percents by weight, it is not preferable because crack resistance of the cured paint film decreases.

Examples of the other radical polymerizable monomers include, for example, methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, hexyl methacrylate, cyclohexyl methacrylate, 2-ethylhexyl methacrylate, octyl methacrylate, lauryl methacrylate, stearyl methacrylate, styrene, acrylonitrile, methacrylonitrile, acrylamide, methacrylamide, acrylic acid, methacrylic acid, itaconic acid, methaconic acid, maleic acid and fumaric acid. The other radical polymerizable monomer can be utilized in single kind or in mixture of two or more members.

When the epoxy group-containing radical polymerizable monomer is used in the structure of the acrylic resin, it is not preferable to use the carboxyl group-containing radical polymerizable monomer such as acrylic acid, methacrylic acid, itaconic acid, methaconic acid, maleic acid and fumaric acid, in order to avoid gelation in the synthetic reaction.

As the monomers for constructing the acrylic resin structure part, a radical polymerizable monomer having one or more organic groups represented by formula (3):

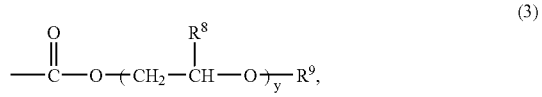

(3)

wherein $R^8$ and $R^9$ are each hydrogen atom or an alkyl group having 1 to 4 carbon atoms and y is an integer from 1 to 10.

Examples of the radical polymerizable monomer include, for example, 2-methoxypropyl acrylate, 2-methoxyethyl acrylate, 2-ethoxypropyl acrylate, 2-ethoxyethyl acrylate, 2-methoxypropyl methacrylate, 2-methoxyethyl methacrylate, 2-ethoxypropyl methacrylate, 2-ethoxyethyl methacrylate, BLENMER PME-100, BLENMER PME-200, BLENMER PME-400, BLENMER PE-90, BLENMER PE-200, BLENMER PE-350, BLENMER PP-1000 and BLENMER PP-500 (all trade names, a product of NOF CORPORATION). The radical polymerizable monomer can be utilized in single kind or in mixture of two or more members.

The radical polymerizable monomer having one or more organic group represented by formula (3) is useful for orienting ingredient (C) effectively on the surface of the paint film even if the amount of ingredient (C) is small.

Such radical polymerizable monomer is used preferably in the range from 1 to 40 percents by weight, more preferably in the range from 1 to 30 percents by weight, most preferably in the range from 2 to 25 percents by weight in all monomers for constructing the acrylic resin structure part. When the content of the radical polymerizable monomer is less than 1 percent by weight, it is not preferable because the degree of surface orientation of ingredient (C) decreases and hydrophilic property is insufficient. When the content of the radical polymerizable monomer is more than 40 percents by weight, it is not preferable because polar of the paint film is too high and therefore smoothness of surface and water resistance decrease.

The modified resin of ingredient (F) used in the present first invention includes a modified resin (F') prepared by normal radical solution polymerization of a mixture of polymerizable monomers for an acrylic resin synthesis comprising a hydroxyl group-containing radical polymerizable monomer or both of a hydroxyl group-containing radical polymerizable monomer and an epoxy group-containing radical polymerizable monomer, in the presence of an organosilicate represented by formula (2) and/or the condensate thereof, and a modified resin prepared by polymerizing a mixture of polymerizable monomers for an acrylic resin synthesis to obtain the precursor of the modified acrylic resin and then reacting the precursor with the organosilicate represented by formula (2) and/or condensate thereof during heating. In the latter modified resin, there are some cases that the organosilicate and/or the condensate thereof are generated by liberation and exist as spot pattern in the paint film and damages the appearance. Therefore, the former modified resin is preferable.

The organosilicate represented by formula (2) and/or the condensate thereof is used preferably in the range from 1 to 70 percents by weight, more preferably in the range from 3 to 50 percents by weight, most preferably in the range from 5 to 40 percents by weight in the modified resin of ingredient (F). When the content of the organosilicate and/or the condensate thereof is less than 1 percent by weight, it is not preferable because stain resistance of the finish cured paint film becomes insufficient. When the content of the organosilicate and/or the condensate thereof is more than 70 percents by weight, it is not preferable because water resistance of the cured paint film decreases.

In the stain resistant coating composition of the present first invention, the content of the modified resin of ingredient (F) is preferably in the range from 1 to 70 parts by weight, more preferably in the range from 5 to 55 parts by weight, most preferably in the range from 10 to 40 parts by weight based on 100 parts by weight of all nonvolatile matters of ingredients (A) through (D). When the content of ingredient (F) is less than 1 part by weight, it is not preferable because stain resistance of the finish cured paint film becomes insufficient. When the content of ingredient (F) is more than 70 parts by weight, it is not preferable because water resistance of the cured paint film decreases.

In the stain resistant coating composition of the present second invention, the modified resin of ingredient (F') is used to disperse in the paint film homogeneously the organosilicate and/or the condensate thereof which are required to give hydrophilic property to the paint film, and to obtain both of manifestation of hydrophilic property and improvement of water resistance.

The modified resin can be prepared by normal radical copolymerization of a hydroxyl group-containing radical polymerizable monomer and other radical polymerizable monomer in an organic solvent, or by normal radical copolymerization of a hydroxyl group-containing radical polymerizable monomer, an epoxy group-containing radical polymerizable monomer and other radical polymerizable monomer in an organic solvent, in the presence of the organosilicate represented in formula (2):

$(R^3)_n—Si—(OR^4)_{4-n}$ (2), wherein $R^3$ and $R^4$ are each hydrogen atom, an alkyl group having 1 to 10 carbon atoms or an aryl group having 1 to 10 carbon atoms and n is 0 or 1, and/or a condensate thereof.

The components utilized for preparing the modified resin of ingredient (F') are the same as the components utilized for preparing the modified resin of ingredient (F). The contents of the components are the same as the contents of the components utilized for preparing the modified resin of ingredient (F).

In the stain resistant coating composition of the present second invention, the modified resin of ingredient (F') is used preferably in the range from 3 to 80 percents by weight, more preferably in the range from 10 to 80 percents by weight, most preferably in the range from 20 to 80 percents by weight based on the total amount of all nonvolatile matters of ingredients (F'), (B) and (C). When the content of ingredient (F') is less than 3 percents by weight, it is not preferable because stain resistance of the finish cured paint film becomes insufficient. When the content of ingredient (F') is more than 80 percents by weight, it is not preferable because water resistance of the cured paint film decreases.

Ingredient (B) used in the stain resistant coating composition of the present second invention is a compound which causes a thermosetting reaction with ingredient (F'), and is a compound having in the molecule at least one functional group selected from the group consisting of carboxyl group, carboxylic acid anhydride group and carboxyl group blocked with an alkylvinyl ether compound (may be called as a curing agent, hereafter). Ingredient (B) used in the stain resistant coating composition of the present second invention is the same as ingredient (B) used in the stain resistant coating composition of the present first invention.

In the stain resistant coating composition of the present second invention, the content of the curing agent of ingredient (B) is preferably in the range from 3 to 80 percents by weight, more preferably in the range from 5 to 70 percents by weight, most preferably in the range from 10 to 50 percents by weight based on the total amount of all nonvolatile matters of ingredients (F'), (B) and (C). When the content of ingredient (B) is less than 3 percents by weight, it is not preferable because solvent resistance of the finish cured paint film becomes insufficient. When the content of ingredient (B) is more than 80 percents by weight, it is not preferable because crack resistance of the cured paint film decreases.

Ingredient (C) used in the stain resistant coating composition of the present second invention is required to manifest high degree of stain resistance in a short time after the curing of the paint film by floating on the surface of the paint film to form a concentrated layer, and is an organosilicate represented by formula (1) and/or a condensate thereof. Ingredient (C) used in the stain resistant coating composition of the present second invention is the same as ingredient (C) used in the stain resistant coating composition of the present first invention.

In the stain resistant coating composition of the present second invention, the content of the organosilicate and/or a condensate thereof of ingredient (C) is preferably in the range from 0.1 to 30 percents by weight, more preferably in the range from 0.2 to 25 percents by weight, most preferably in the range from 0.5 to 20 percents by weight based on the total amount of all nonvolatile matters of ingredients (F'), (B) and (C). When the content of ingredient (C) is less than 0.1 percent by weight, it is not preferable because the contact angle of water on the cured paint film does not decrease until the purposed stain resistance is met. When the content of ingredient (C) is more than 30 percents by weight, it is not preferable because water resistance of the cured paint film decreases.

When stain resistance is required to manifest immediately after the formation of the cured paint film in the stain resistant coating composition of the present second invention, a catalyst for promoting hydrolysis reaction can be formulated. The catalyst for promoting hydrolysis reaction (may be called as hydrolysis catalyst, hereafter) can manifest the stain resistance in an early stage by hydrolyzing alkoxy group of the organosilicate and/or the condensate thereof of ingredient (C). The hydrolysis catalyst includes, for example, organometallic compounds such as dibutyl tin diacetate, dibutyl tin dilaurate, dibutyl tin dimaleate, tin octylate and dibutyl tin dioxide; sulfonic acid compounds such as paratoluene sulfonic acid, dodecylbenzene sulfonic acid, dinonylnaphthalene sulfonic acid, dinonylnaphthalene disulfonic acid and methanesulfonic acid; organophosphoric acid compounds such as ethyl phosphate, butyl phosphate and octyl phosphate; basic compounds such as triethyl amine, dimethylbenzyl amine, dimethylethanol amine, dimethyllauryl amine, dibutyl amine, di-2-ethylhexyl amine, tetramethylbutane diamine, pyridine and triethanol amine.

The temperature and time required in curing of the stain resistant coating composition of the present invention are not limited particularly. In General, the curing is completed by heating at the temperatures in the range from 50 to 300° C. for the time in the range from 10 seconds to 24 hours.

The stain resistant coating composition of the present invention can be formulated without other ingredients or with coloring pigments, brilliant pigments, fillers, solvents, ultraviolet light absorbents, radical scavengers, antioxidants, anti-popping agents, surface conditioners, antisagging agents, flow controlling agents, curing catalysts, surface active agents, antistatic agents, perfumes or dehydrating agents, according to needs.

The thickness of the paint film formed by applying the stain resistant coating composition of the present invention is not limited particularly, and can be selected, for example, in the range from 1 to 100 μm, generally in the range from 10 to 60 μm. When the paint film has two or more layers, the thickness of each layers can be selected to be in the range described above. Methods of coating include methods of coating by conventional coating machines such as air spray, airless spray, electrostatic air spray, electrostatic rotary atomizing coater, dip type coater, roll coater and the like.

Substrates applied with the coating composition are not limited particularly and various substrates can be utilized. Examples of the substrates include organic or inorganic substrate materials, such as woods, glasses, metals, fabrics, plastics, foamed articles, elastomers, papers, ceramics, concretes and gypsum boards.

The stain resistant coating composition of the present invention can be utilized as coating compositions used in the methods of preparing articles having a paint film of single layer top coat or a multilayer paint film constructed with colored base coat and clear top coat, and for example, as coating compositions for automobiles and other road vehicles. When the stain resistant coating composition is utilized as such coating compositions, pigments can be formulated in the range from 0 to 200 parts by weight based on 100 parts by weight of all nonvolatile matters of ingredients (A) through (F). When the pigments are formulated, it is preferable to formulate in at least 0.1 parts by weight. As the pigments, pigments used in normal coating compositions, such as organic pigments, inorganic pigments, metallic pigments, and plastic pigments can be utilized without any limitation.

Example of the multilayer paint film include a multilayer paint film prepared by applying a colored film forming composition on a substrate to form a base coat film and then applying a clear film forming composition of the stain resistant coating composition of the present invention, on the base coat. The colored film forming composition may be any type of solvent type or aqueous type. After the colored film forming composition is applied and cured by heating, the clear film forming composition of the stain resistant coating composition of the present invention can be applied. Alternatively, after the colored film forming composition is applied, the clear film forming composition of the stain resistant coating composition of the present invention can be applied on uncured base coat and cured to form two layers at the same time.

The method of coating to form the multilayer paint film includes a method which comprises heating the colored film forming composition for the base coat or controlling the desired viscosity by adding organic solvents or reactive diluents according to needs, and applying the colored film forming composition on the substrate by using the above mentioned method in an amount to form a film having dried thickness of 5 to 40 μm, preferably 7 to 35 μm, allowing to stand at room temperature to 100° C. for 1 to 20 minutes, followed applying the clear forming composition for the clear coat film on the base coat by using the above mentioned method in an amount to form a film having dried thickness of 10 to 100 μm, preferably 10 to 60 μm and curing, in general, in the condition of 50 to 300° C. for 5 seconds to 24 hours and the like, and a method which comprises, in the case of two coat one bake coating, for example, diluting the colored film forming composition with suitable solvents such as organic solvents to control the desired viscosity, applying the colored film forming composition on the substrate by using the above mentioned method in an amount to form a film having dried thickness of 5 to 40 μm, preferably 7 to 35 μm, allowing to stand at room temperature to 100° C. for 1 to 20 minutes, followed applying the clear forming composition for the clear coat film on the base coat by using the above mentioned method in an amount to form a film having dried thickness of 10 to 100 μm, preferably 10 to 60 μm and curing, in general, in the condition of 50 to 300° C. for 5 seconds to 24 hours and the like.

Further, the stain resistant coating composition of the present invention can be utilized as an over coat clear coating composition applied on a paint film which is completed by top coat application. The top coat paint film is preferably a paint film which is formed by applying the solvent type or the aqueous type of the colored film forming composition described above and applying a clear coating composition (may be called as under clear coating composition, hereafter) selected in the group consisting of a coating composition of an acrylic resin/aminoplast resin coating composition, an acrylic resin/urethane resin hardner coating composition and an acrylic resin/aminoplast resin/urethane resin hardner coating composition, and curing two layers at the same time. The under clear coating composition is desirably a coating composition comprising a resin mixture of (a) a hydroxyl group- and epoxy group-containing acrylic resin in the range from 40 to 80 percents by weight, preferably 45 to 75 percents by weight, (b) an aminoplast resin in the range from 0 to 60 percents by weight, preferably in the range from 10 to 50 percents by weight, and (c) an urethane resin hardner in the range from 0 to 60 percents by weight, preferably in the range from 1 to 30 percents by weight, as main component, in view of the adhesive property to the over coat clear coating composition.

The hydroxyl group- and epoxy group-containing acrylic resin of ingredient (a) can be obtained by normal radical copolymerizing a hydroxyl group-containing radical polymerizable monomer, an epoxy group-containing radical polymerizable monomer and other radical polymerizable monomer in an organic solvent. When the content of ingredient (a) is less than 40 percents by weight, it is not preferable because the adhesive property to the over coat clear coating composition decreases. When the content of ingredient (a) is more than 80 percents by weight, it is not preferable because the gasoline resistance of the cured paint film decreases.

The aminoplast resin of ingredient (b) includes, for example, melamine resins, urea resins, guanamine resins, and glycollyl resins. But, the melamine resins are particularly preferable, in view of weathering resistance. When the content of ingredient (b) is more than 60 percents by weight, it is not preferable because crack resistance of the cured paint film decreases.

The urethane resin hardner of ingredient (c) is a compound having a functional group which can form an urethane bond by chemical reacting with a polyol and the like, and includes, for example, polyisocyanate compounds, blocked polyisocyanate compounds and polycarbamate compounds. But, blocked polyisocyanate compounds are preferable. More preferably, aliphatic blocked polyisocyanate compounds are preferable in view of yellowing resistance of the cured paint film. When the content of ingredient (c) is more than 60 percents by weight, it is not preferable because crack resistance of the cured paint film decreases.

The under clear coating composition can be formulated with acrylic resins, polyester resins, coloring pigments, brilliant pigments, fillers, solvents, ultraviolet light absorbents, radical scavengers, antioxidants, anti-popping agents, surface conditioners, antisagging agents, flow controlling agents, curing catalysts, surface-active agents, antistatic agents, perfumes or dehydrating agents, according to needs.

The method of applying the under clear coating composition and the over coat clear coating composition includes a method which comprises heating the colored base coating composition or controlling the desired viscosity by adding organic solvents or reactive diluents according to needs, and applying the colored coating composition on the substrate in an amount to form a film having dried thickness of 5 to 300 μm and allowing to stand at room temperature to 100° C. for 1 to 20 minutes, followed applying the under clear coating composition by using the above mentioned method in an amount to form a film having dried thickness of 10 to 100 μm, preferably 10 to 60 μm and curing, in general, in the condition of 50 to 300° C. for 5 seconds to 24 hours and then applying the over coat clear coating composition by using the above mentioned method in an amount to form a film having dried thickness of 10 to 100 μm, preferably 10 to 60 μm and curing, in general, in the condition of 50 to 300° C. for 5 seconds to 24 hours and the like.

When the stain resistant coating composition of the present invention for the over coat is applied on the under clear cured paint film for the overcoat, the over coat clear coating composition can be applied after a clear primer application.

Coated articles prepared by applying the coating composition of the present invention include, for example, structures, wood articles, metal articles, plastics articles, rubber articles, coated papers, ceramic articles and glass articles, specifically automobiles, metal plates such as steel plates; two-wheel vehicles, railway vehicles, airplanes, furnitures, musical instruments, house-hold electric instruments, building materials, vessels, office articles, sport articles and toys.

EXAMPLE

The invention is explained in detail with reference to the following Examples; however, these Examples are intended to illustrate the invention and are not to be construed to limit the scope of the invention.

Evaluation of the properties of the paint films obtained by the stain resistant coating compositions of the present invention were conducted as follows.

(1) Finished Appearance

The finished appearance of the paint film was evaluated by visual observation according to the following standard.

○: when a fluorescent lamp was projected on the paint film, the image of the fluorescent lamp was vividly observed.

Δ: when a fluorescent lamp was projected on the paint film, the image of the outline of the fluorescent lamp was dimly observed.

X: when a fluorescent lamp was projected on the paint film, the image of the outline of the fluorescent lamp was remarkable dimly observed.

(2) Contact Angle of Water

The obtained test piece was exposed in outdoor exposure for 7 to 30 days, according to the measurement method of Japanese Industrial Standard K-5400 (1990) 9.9, weathering resistance. Next, the test piece was washed and then 0.8 μl of a liquid-drop of deionized water was applied on the paint film at 20° C. by using an injector and the contact angle was measured by using a measuring machine of contact angle G-I of ELMA goniometer produced by ELMA Co., Ltd. The contact angles of the liquid-drop were measured after 30 seconds, 60 seconds and 90 seconds. The contact angle of 0 second was extrapolated by liner regression formula of the times and the contact angles, and decided as the contact angle of the paint film.

(3) Stain Resistance in Outdoor Exposure

The outdoor exposure test of test piece was conducted for 3 months according to the measurement method of Japanese Industrial Standard K-5400 (1990) 9.9, weathering resistance, and the color of unwashed surface of the paint film (Japanese Industrial Standard K-5400 (1990) 7.4.2, prompt report) was measured. Stain property was evaluated by a difference (ΔL) which is calculated by subtracting initial L value before the outdoor exposure from L value after the outdoor exposure.

(4) Weathering Resistance

By using a weathering resistance tester of sunshine carbon arc lamp (Japanese Industrial Standard K-5400 (1990) 9.8.1), a test piece was exposed for 3000 hours. Condition of the paint film was observed by visual comparison.

(5) Water Resistance

The test piece was dipped in warm water of 40° C. for 240 hours and then was taken out. The surface condition of the test piece was observed by visual.

(6) Acid Resistance

On a test piece, 0.2 ml of 40 percents by weight-sulfuric acid was applied as a spot and condition of the paint film was observed by visual comparison after heating for 30 minutes at 60° C.

Preparation Example of Amine Salt of Aliphatic Sulfonic Acid Compound of Ingredient (A)

Preparation Example 1

Into a three-necked flask equipped with a stirrer, the mixture of the following components was charged and 104.3 parts by weight of 35 percents by weight-hydrochloric acid were added under stirring at room temperature to remove sodium atom. The ion exchange reaction was proceeded immediately after addition of hydrochloric acid to precipitate 58.5 parts by weight of NaCl. The precipitated NaCl is filtered to fractionate by filtration under reduced pressure. Into the filtrate, 79.0 parts by weight of pyridine were added to obtain a solution A-1 of amine salt of aliphatic sulfonic acid compound blocked with the same mole of pyridine, containing 25 percents by weight of effective component concentration (as aliphatic sulfonic acid compound).

| $C_{18}H_{37}SO_3Na$ | 356.0 parts by weight |
| n-butanol | 855.2 parts by weight |

Preparation Example 2

Into a three-necked flask equipped with a stirrer, the mixture of the following components was charged and 104.3 parts by weight of 35 percents by weight-hydrochloric acid were added under stirring at room temperature to remove sodium atom. The ion exchange reaction was proceeded immediately after addition of hydrochloric acid to precipitate 58.5 parts by weight of NaCl. The precipitated NaCl is filtered to fractionate by filtration under reduced pressure. Into the filtrate, 101 parts by weight of N-methylmorpholine were added to obtain a solution A-1 of amine salt of aliphatic sulfonic acid compound blocked with the same mole of N-methylmorpholine, containing 25 percents by weight of effective component concentration (as aliphatic sulfonic acid compound).

| RAPISOL B90[1] | 493.3 parts by weight |
| n-butanol | 1135.9 parts by weight |

[1]trade name, sodium dioctylsulfo succinate (90 percents by weight of effective material), produced by NOF CORPORATION.

Preparation of Curing Agent of Ingredient (B)

Preparation Example 3

Into a four-necked flask equipped with a thermometer, a reflux condenser, a stirrer and a dropping funnel, 136 parts by weight of pentaerythritol and 538.7 parts by weight of methyl isobutyl ketone were charged and the mixture was heated under stirring until the temperature reached to 120° C. To the mixture kept at 120° C., 672 parts by weight of methylhexahydrophthalic anhydride were added by dropping for 2 hours and the mixture was kept under stirring and heating until acid value of the mixture decreased to a value of not more than 170. The acid value was measured by diluting the same sample 50 times by weight with a mixture of pyridine and water (pyridine/water=9/1 (by weight)), heating for 30 minutes at 90° C. and titrating with a standard solution of potassium hydroxide. Thus, a solution of polycarboxylic acid was prepared.

Into the flask like the flask described above, a mixture of the following composition including the solution of polycarboxylic acid prepared above was charged and mixed at 50° C. during stirring.

| | |
|---|---|
| solution of polycarboxylic acid described above | 336.7 parts by weight |
| isobutyl vinyl ether | 120.2 parts by weight |
| monooctyl phosphate | 0.2 parts by weight |
| methyl isobutyl ketone | 46.3 parts by weight |

The reaction was finished when acid value of the mixture decreased to a value of not more than 12 and the mixture was transferred to a separation funnel after cooling by standing. The reaction mixture was washed with 100 parts by weight of alkaline water containing 10 weight % of sodium bicarbonate in the funnel and then washed with 300 parts by weight of deionized water repeatedly until pH of the washed water became 7 or below. And then the organic layer was dried by adding Molecular Sieves 4A/16 and standing for 3 days at the room temperature. As a result, a solution of curing agent B-1 having Gardener viscosity (25° C.) of E-F, nonvolatile matter of 60 percents by weight and carboxylic acid equivalent of 493 as the solution was obtained.

Preparation Example 4

Into a four-necked flask equipped with a thermometer, a reflux condenser, a stirrer and a dropping funnel, 84 parts by weight of methyl amyl ketone were charged and the mixture was heated under stirring until the temperature reached to 100° C. To the mixture kept at 140° C., a mixture of the monomers and the polymerization initiator of the following composition (dropping material) was added by dropping at constant velocity for 2 hours.

| | |
|---|---|
| methacrylic acid | 20 parts by weight |
| n-butyl methacrylate | 35 parts by weight |
| n-butyl acrylate | 45 parts by weight |
| t-butylperoxy-2-ethylhexanoate | 5 parts by weight |

After the dropping, the mixture was kept to the temperature of 140° C. for 1 hour and the reaction temperature was decreased to 110° C. And then, 1 part by weight of t-butylperoxy-2-ethylhexanoate and 10 parts by weight of methyl amyl ketone were added into the mixture. The mixture was kept at 110° C. for 2 hours. The reaction was finished and a solution of curing agent B-2 having Gardener viscosity (25° C.) of R—S, nonvolatile matter of 50.4 percents by weight and carboxylic acid equivalent of 860 as the solution was obtained.

Preparation of Epoxy Group-containing Acrylic Resin of Ingredient (D)

Preparation Example 5

Into a four-necked flask equipped with a thermometer, a reflux condenser, a stirrer and a dropping funnel, 63 parts by weight of xylene were charged and the mixture was heated under stirring until the temperature reached to 100° C. To the mixture kept at 140° C., a mixture of the monomers and the polymerization initiator of the following composition (dropping material) was added by dropping at constant velocity for 2 hours.

| | |
|---|---|
| glycidyl methacrylate | 35 parts by weight |
| n-butyl methacrylate | 50 parts by weight |
| n-butyl acrylate | 15 parts by weight |
| t-butylperoxy-2-ethylhexanoate | 2 parts by weight |

After the dropping, the mixture was kept to the temperature of 140° C. for 1 hour and the reaction temperature was decreased to 110° C. And then, 0.5 parts by weight of t-butylperoxy-2-ethylhexanoate and 2 parts by weight of xylene were added into the mixture. The mixture was kept at 110° C. for 2 hours. The reaction was finished and a solution of acrylic resin D-1 having Gardener viscosity (25° C.) of U-V, nonvolatile matter of 59.4 percents by weight and carboxylic acid equivalent of 680 as the solution was obtained.

Preparation of Composite Having a Structure of Core/Shell in Which the Nonvolatile Matter of Inorganic Oxide Sol of Ingredient (E) is Coated with Acrylic Polymer Preparation Example 6

Into a three-necked flask equipped with a thermometer, a reflux condenser and a stirrer, 100 parts by weight of SNOWTEX IPA-ST (trade name, a product of Nissan chemical Industries LTD., silica sol, nonvolatile matter of 30 percents by weight), 10 parts by weight of γ-methacryloxy methyldimethoxysilane and 5 parts by weight of deionized water were charged and the mixture was stirred at 80° C. for 8 hours. Next, 120 parts by weight of methyl amyl ketone were charged into the mixture described above and mixed. The mixture was transferred into an eggplant type flask. By using an evaporator, isopropanol and water were removed in the condition of 30 to 40° C. and 6000 to 8000 Pa until the content became 160 parts by weight.

Into a four-necked flask equipped with a thermometer, a reflux condenser, a stirrer and a dropping funnel, 100 parts by weight of the content in the evaporator obtained by the method described above and 300 parts by weight of methyl isobutyl ketone were charged and the mixture was heated under stirring at 115° C. To the mixture kept at 115° C., a mixture of the monomers and the polymerization initiator of the following composition (dropping material) was added by dropping at constant velocity for 2 hours from the dropping funnel.

| | |
|---|---|
| Glycidyl methacrylate | 15 parts by weight |
| n-butyl methacrylate | 30 parts by weight |
| n-butyl acrylate | 30 parts by weight |
| 2,2'-azobisisobutyronitrile | 4 parts by weight |
| n-butyl acetate | 200 parts by weight |

After the dropping, the mixture was kept to the temperature of 115° C. for 1 hour. And then, 0.1 parts by weight of 2,2'-azobisisobutyronitrile and 2 parts by weight of n-butyl acetate were added into the mixture. The mixture was kept at 115° C. for 2 hours and then the radical polymerization reaction was finished. A DIEN STARK trap was equipped between the reflux condenser and the flask of the four-necked flask described above and 300 parts by weight of the solvent were removed by distillation from the mixture in the condition of 70 to 80° C. and 3000 to 4000 Pa. And then, 75 parts by weight of SOLVESSO 100 (trade name, a product of ESSO CO., aromatic petroleum naphtha) were added into the condensed mixture and followed, 200 parts by weight of solvent was removed by distillation from the mixture in the condition of 70 to 80° C. and 3000 to 4000 Pa. A dispersing liquid of composite having a structure of core/shell coated with an acrylic polymer, E-1 having nonvolatile matter of 40 percents by weight and an epoxy equivalent of 2370 was obtained.

Preparation of Modified Resin of Ingredient (F)

Preparation Example 7

Into a three-necked flask equipped with a thermometer, a reflux condenser, a stirrer and a dropping funnel, 60 parts by weight of xylene and 20 parts by weight of METHYL SILICATE 51 (trade name, a product of COLCOAT Co., Ltd., condensate of organosilicate) were charged and the mixture was heated under stirring until the temperature reached to 100° C. To the mixture kept at 140° C., the mixture of the monomers and polymerization initiator of the following components were added by dropping at constant velocity for 2 hours from the dropping funnel.

After the dropping, the mixture was kept to the temperature of 140° C. for 1 hour and the reaction temperature was decreased to 110° C. And then, 0.2 parts by weight of t-butylperoxy-2-ethylhexanoate and 4.5 parts by weight of xylene were added into the mixture. The mixture was kept at 110° C. for 2 hours. The reaction was finished and a solution of modified resin F-1 having nonvolatile matter of 59.7 percents by weight was obtained.

| | |
|---|---|
| glycidyl methacrylate | 24 parts by weight |
| n-butyl acrylate | 24 parts by weight |
| methyl methacrylate | 28 parts by weight |
| 2-hydroxyethyl methacrylate | 4 parts by weight |
| t-butylperoxy-2-ethylhexanoate | 2 parts by weight |

Examples 1 to 4

(1) Preparation of Clear Coating Composition

The clear coating compositions were prepared by mixing the raw materials of composition shown in Table 1.

TABLE 1

| | | Example | | | |
|---|---|---|---|---|---|
| | | 1 | 2 | 3 | 4 |
| Formulation ratio (parts by weight) | | | | | |
| (A) | Solution of amine salt of aliphatic sulfonic acid, A-1[1] | 0.8 | — | 1 | — |
| | Solution of amine salt of aliphatic sulfonic acid, A-2[2] | — | 1.2 | — | 1.2 |
| (B) | Solution of curing agent, B-1[3] | 72.5 | — | 82.9 | — |
| | Solution of curing agent, B-2[4] | — | 126.5 | — | 114.1 |
| (C) | Silicate, C-1[5] | 16 | — | 20 | — |
| | Silicate, C-2[6] | — | 3 | — | 12 |
| (D) | Solution of acrylic resin, D-1[7] | 100 | 100 | 100 | 50 |
| (E) | Dispersing liquid of composite, E-1[8] | — | — | 50 | 20 |
| (F) | Solution of modified resin, F-1[9] | — | — | — | 50 |
| Others | | | | | |
| Curing catalyst[10] | | 2 | 2.5 | 2.5 | 2.5 |
| Solution of ultraviolet light absorbent[11] | | 10 | 12 | 12 | 12 |
| Solution of light stabilizer[12] | | 10 | 12 | 12 | 12 |
| Solution of surface controlling agent[13] | | 2 | 2.5 | 2.5 | 2.5 |
| SOLVESSO 100[14] | | 10 | 9 | 12 | 12 |

The materials of the superiors in the Table are the followings.
[1]Solution of amine salt of aliphatic sulfonic acid of Preparation Example 1, A-1
[2]Solution of amine salt of aliphatic sulfonic acid of Preparation Example 2, A-2
[3]solution of curing agent of Preparation Example 3, B-1
[4]solution of curing agent of Preparation Example 4, B-2
[5]MKC-SILICATE MS56SB5 (trade name, a product of MITSUBISHI CHEMICAL CORPORATION, Mw 750)
[6]ETHYL SILICATE 40 (trade name, a product of TAMA CHEMICAL CO., LTD., Mw 1500)
[7]Solution of epoxy group-containing acrylic resin of Preparation Example 5, D-1
[8]dispersing liquid of composite having a structure of core/shell coated with an acrylic polymer of Preparation Example 6, E-1
[9]solution of modified resin of Preparation Example 7, F-1
[10]solution of 10 percents by weight of tetrabutyl ammonium bromide in isobutyl acetate
[11]solution of 20 percents by weight of TINUVIN 900 (trade name, a product of CHIBA SPECIALTY CHEMICALS Co.) in xylene
[12]solution of 20 percents by weight of TINUVIN 292 (trade name, a product of CHIBA SPECIALTY CHEMICALS Co.) in xylene
[13]solution of 10 percents by weight of BYK-300 (trade name, a product of BYK-Chemie Japan K.K.) in xylene
[14]trade name, a product of ESSO Co., aromatic petroleum naptha (2) Preparation of Test Pieces and Evaluation of Paint Film Properties Cationic electrodeposition coat AQUA No. 4200 (trade name, a product of NOF CORPORATION) was applied by electrodeposition to a soft steel plate treated with zinc phosphate in an amount to form a film having dried thickness of 20 μm and the coated plate was baked at 175° C. for 25 minutes. Intermediate coat HS-H300 (trade name, a product of NOF CORPORATION) was applied to the coated plate by air spraying in an amount to form a film having dried thickness of 30 μm and the plate was baked at 140° C. for 30 minutes. And further, white base coating composition, BELCOAT No. 6000 (trade name, a product of NOF CORPORATION) was applied to intermediate coat by air spraying in an amount to form a film having dried thickness of 15 μm. After the coated plate was set at 20° C. for 3 minutes, the coating composition prepared in above mentioned (1) was diluted with thinner (SOLVESSO 100/butyl acetate=9/1 of weight ratio) to a viscosity required for spraying (25 seconds at 20° C. by Ford cup No. 4) and was applied on the plate by air spraying in wet-on-wet coating method in an amount to form a film having dried thickness of 40 µm and the plate was baked at 140° C. for 30 minutes to obtain a test piece. Results of the evaluation of paint film properties are shown in Table 2. In all cases, uniform paint films having good gloss were prepared. All the paint films had excellent appearance of paint film, hydrophilic property, stain resistance in outdoor exposure, weathering resistance, water resistance and acid resistance.

Examples 5 and 6

Cationic electrodeposition coat AQUA No. 4200 (trade name, a product of NOF CORPORATION) was applied by electrodeposition to a soft steel plate treated with zinc phosphate in an amount to form a film having dried thickness of 20 µm and the coated plate was baked at 175° C. for 25 minutes. Intermediate coat HS-H300 (trade name, a product of NOF CORPORATION) was applied to the prepared plate by air spraying in an amount to form a film having dried thickness of 30 µm and the plate was baked at 140° C. for 30 minutes. And further, solvent type white base coating composition, BELCOAT No. 6000 (trade name, a product of NOF CORPORATION) was applied to intermediate coat by air spraying in an amount to form a film having dried thickness of 15 µm. After the coated plate was set at 20° C. for 3 minutes, the following coating composition was applied on the plate by air spraying in wet-on-wet coating method in an amount to form a film having dried thickness of 40 µm and the plate was baked at 140° C. for 30 minutes. Further, the clear coating composition prepared in Example 1 was applied on the plate obtained by the above method as over coat coating application in Example 5 and the clear coating composition prepared in Example 2 was applied on the plate obtained by the above method as over coat coating application in Example 6, and the plates were baked in the condition of 140° C. for 30 minutes. Results of the evaluation of paint film properties are shown in Table 2. In all cases, uniform paint films having good gloss were prepared. All the paint films had excellent appearance of paint film, hydrophilic property, stain resistance in outdoor exposure, weathering resistance, water resistance and acid resistance.

Preparation of Under Clear Coating Composition

Into a four-necked flask equipped with a thermometer, a reflux condenser, a stirrer and a dropping funnel, 60 parts by weight of xylene were charged and heated under stirring until the temperature reached to 140° C. To the solvent kept at 140° C., a mixture of 8 parts by weight of glycidyl methacrylate, 77 parts by weight of butyl methacrylate, 15 parts by weight of 2-hydroxyethyl methacrylate and 2 parts by weight of t-butylperoxy-2-ethylhexanoate was added by dropping at constant velocity for 2 hours from the dropping funnel.

After the dropping, the mixture was kept to the temperature of 140° C. for 1 hour and the reaction temperature was decreased to 110° C. And then, a mixture of 0.2 parts by weight of t-butylperoxy-2-ethylhexanoate and 4.5 parts by weight of xylene was added to the mixture. The mixture was kept at 110° C. for 2 hours. The reaction was finished and a solution of acrylic resin for under clear coating composition U-1 having nonvolatile matter of 60.9 percents by weight was obtained.

Next, the following raw materials including the solution of acrylic resin prepared above was mixed to prepare the under clear coating composition.

| | |
|---|---|
| solution of acrylic resin prepared above, U-1 | 100 parts by weight |
| U-VAN 20SE-60 (a product of MITSUI CHEMICALS INC., solution of melamine resin, nonvolatile matter of 60 percents by weight) | 50 parts by weight |
| SUMIDUR BL-3175 (a product of SUMITOMO BAYER URETHANE Co., solution of blocked polyisocyanate compound of trimer of hexamethylene diisocyanate, nonvolatile matter of 75 percents by weight) | 13.3 parts by weight |
| Xylene solution of 20 percents by weight of TINUVIN 900 | 5 parts by weight |
| Xylene solution of 20 percents by weight of TINUVIN 292 | 5 parts by weight |
| Xylene solution of 20 percents by weight of BYK-300 | 0.5 parts by weight |
| 2-ethylhexyl phosphate | 0.5 parts by weight |
| Xylene solution of 20 percents by weight of dibutyl tin dilaurate | 2.5 parts by weight |
| SOLVESSO 100 | 5 parts by weight |

The under clear coating composition prepared above was diluted with thinner (SOLVESSO 100/n-butanol=9/1 of weight ratio) to a viscosity required for spraying (25 seconds at 20° C. by Ford cup No. 4)

Examples 7 and 8

Cationic electrodeposition coat AQUA No. 4200 (trade name, a product of NOF CORPORATION) was applied by electrodeposition to a soft steel plate treated with zinc phosphate in an amount to form a film having dried thickness of 20 µm and the coated plate was baked at 175° C. for 25 minutes. Intermediate coat HS-H300 (trade name, a product of NOF CORPORATION) was applied to the prepared plate by air spraying in an amount to form a film having dried thickness of 30 µm and the plate was baked at 140° C. for 30 minutes. And further, aqueous type white base coating composition, AQUA BC-3 (trade name, a product of NOF CORPORATION) was applied to intermediate coat by air spraying in an amount to form a film having dried thickness of 15 µm. After the coated plate was set at 20° C. for 3 minutes and dried at 80° C. for 10 minutes, the plate was allowed to stand and cooled until room temperature. Each of the under clear coating composition described in Examples 5 and 6 was applied on each of the plates by air spraying in an amount to form a film having dried thickness of 40 µm and the plates were baked at 140° C. for 30 minutes. Further, the clear coating composition prepared in Example 3 was applied on the plate obtained by the above method as over coat coating application in Example 7, and the clear coating composition prepared in Example 4 was applied on the plate obtained by the above method as over coat coating application in Example 8, in an amount to form a film having dried thickness of 40 µm and the plates were baked at 140° C. for 30 minutes to obtain test pieces. Results of the evaluation of paint film properties are shown in Table 2. In all cases, uniform paint films having good gloss were prepared. All the paint films had excellent appearance of paint film, hydrophilic property, stain resistance in outdoor exposure, weathering resistance, water resistance and acid resistance.

TABLE 2

| | Example | | | | | | | |
|---|---|---|---|---|---|---|---|---|
| | 1 | 2 | 3 | 4 | 5 | 6 | 7 | 8 |
| Formulation ratio[1] (part by weight) | | | | | | | | |
| Aliphatic sulfonic acid compound (A) | | | | | | | | |
| A-1 | 0.2 | — | 0.2 | — | 0.2 | — | 0.2 | — |
| A-2 | — | 0.2 | — | 0.2 | — | 0.2 | — | 0.2 |
| Curing agent (B) | | | | | | | | |
| B-1 | 36.3 | — | 33.2 | — | 36.3 | — | 33.2 | — |
| B-2 | — | 50.0 | — | 41.5 | — | 50.0 | — | 41.5 |
| Silicate (C) | | | | | | | | |
| C-1 | 13.4 | — | 13.3 | — | 13.4 | — | 13.3 | — |
| C-2 | — | 2.4 | — | 8.7 | — | 2.4 | — | 8.7 |
| Acrylic resin D-1 | 50.1 | 47.4 | 40.0 | 21.9 | 50.1 | 47.4 | 40.0 | 21.9 |
| Composite E-1 | — | — | 13.3 | 5.8 | — | — | 13.3 | 5.8 |
| Modified resin F-1 | — | — | — | 21.9 | — | — | — | 21.9 |
| Base coat | Solvent type | Solvent type | Solvent type | Solvent type | Solvent type | Solvent type | Aqueous type | Aqueous type |
| Paint film structure | 2C1B[2] | 2C1B[2] | 2C1B[2] | 2C1B[2] | OB[3] | OB[3] | OB[3] | OB[3] |
| Paint film properties | | | | | | | | |
| Finish appearance | ○ | ○ | ○ | ○ | ○ | ○ | ○ | ○ |
| Contact angle of water | | | | | | | | |
| After 7 days | 34° | 29° | 28° | 32° | 35° | 29° | 34° | 33° |
| After 30 days | 32° | 26° | 25° | 29° | 31° | 28° | 30° | 32° |
| Stain resistance in outdoor exposure [ΔL value] | −1.0 | −0.8 | −0.9 | −1.1 | −1.3 | −0.9 | −1.0 | −1.2 |
| Weathering resistance | Non abnormal | Non abnormal | Non abnormal | Non abnormal | Non abnormal | Non abnormal | Non abnormal | Non abnormal |
| Water resistance | Non abnormal | Non abnormal | Non abnormal | Non abnormal | Non abnormal | Non abnormal | Non abnormal | Non abnormal |
| Acid resistance | Non abnormal | Non abnormal | Non abnormal | Non abnormal | Non abnormal | Non abnormal | Non abnormal | Non abnormal |

[1] formulation ratio of nonvolatile matters
[2] 2CIB: two coat-one bake paint film
[3] OB: application of the over coat clear coating composition on the two coat-one bake paint film Comparative Examples 1 and 2

(1) Preparation of Clear Coating Composition

The clear coating compositions were prepared by mixing the raw materials of composition shown in Table 3.

TABLE 3

| | Comparative Example | |
|---|---|---|
| | 1 | 2 |
| Formulation ratio (parts by weight) | | |
| (A) Solution of amine salt of aliphatic sulfonic acid, A-1[1] | — | 0.8 |
| (B) Solution of curing agent, B-1[2] | 72.5 | 72.5 |
| (C) Silicate C-1[3] | 16 | — |
| (D) Solution of acrylic resin, D-1[4] | 100 | 100 |
| Others | | |
| Curing catalyst[5] | 2 | 2 |
| Solution of ultraviolet light absorbent[6] | 10 | 10 |
| Solution of light stabilizer[7] | 10 | 10 |

TABLE 3-continued

|  | Comparative Example | |
|---|---|---|
|  | 1 | 2 |
| Solution of surface controlling agent[8] | 2 | 2 |
| SOLVESSO 100[9] | 10 | 10 |

[1)-9)] materials of the superiors in the Table are the same as describe above.

(2) Preparation of Test Pieces and Evaluation of Paint Film Properties

Cationic electrodeposition coat AQUA No. 4200 (trade name, a product of NOF CORPORATION) was applied by electrodeposition to a soft steel plate treated with zinc phosphate in an amount to form a film having dried thickness of 20 μm and the coated plate was baked at 175° C. for 25 minutes. Intermediate coat HS-H300 (trade name, a product of NOF CORPORATION) was applied to the coated plate by air spraying in an amount to form a film having dried thickness of 30 μm and the plate was baked at 140° C. for 30 minutes. And further, white base coating composition, BELCOAT No. 6000 (trade name, a product of NOF CORPORATION) was applied to intermediate coat by air spraying in an amount to form a film having dried thickness of 15 μm. After the coated plate was set at 20° C. for 3 minutes, the coating composition prepared in above mentioned (1) was diluted with thinner (SOLVESSO 100/butylacetate=9/1 of weight ratio) to a viscosity required for spraying (25 seconds at 20° C. by Ford cup No. 4) and was applied on the plate by air spraying in wet-on-wet coating method in an amount to form a film having dried thickness of 40 μm and the plate was baked at 140° C. for 30 minutes to obtain a test piece. Results of the evaluation of paint film properties are shown in Table 4. In Comparative Example 1, aliphatic sulfonic acid compound of ingredient (A) was not contained and therefore, the hydrophilic property after outdoor exposure manifested in later stage. In Comparative Example 2, organosilicate of ingredient (C) was not contained and therefore, the hydrophilic cured paint film was not obtained and therefore the cured paint film did not manifest stain resistance.

TABLE 4

|  |  | Comparative Example | |
|---|---|---|---|
|  |  | 1 | 2 |
| Formulation ratio (part by weight) |  |  |  |
| Aliphatic sulfonic acid compound (A) | A-1 | — | 0.2 |
| Curing agent (B) | B-1 | 36.4 | 42.0 |
| Silicate (C) | C-1 | 13.4 | — |
| Acrylic resin D-1 |  | 50.2 | 57.8 |
| Base coat |  | Solvent type | Solvent type |
| Paint film structure |  | 2C1B | 2C1B |
| Paint film properties |  |  |  |
| Finish appearance |  | ○ | ○ |
| Contact angle of water |  |  |  |
| After 7 days |  | 59° | 78° |
| After 30 days |  | 48° | 75° |
| Stain resistance in |  | −3.1 | −8.9 |

TABLE 4-continued

|  | Comparative Example | |
|---|---|---|
|  | 1 | 2 |
| Formulation ratio (part by weight) |  |  |
| outdoor exposure [ΔL value] | some stains | remarkable stains |
| Weathering resistance | Non abnormal | Non abnormal |
| Water resistance | Non abnormal | Non abnormal |
| Acid resistance | Non abnormal | Non abnormal |

Preparation of Modified Resin of Ingredient (F')

Preparation Examples 8 and 9

Into a four-necked flask equipped with a thermometer, a reflux condenser, a stirrer and a dropping funnel, a mixture of xylene and organosilicate of composition shown in Table 5 (initial charge) was charged and the mixture was heated under stirring until the temperature reached to 140° C. To the mixture kept at 140° C., a mixture of the monomers and polymerization initiator of composition shown in Table 5 (dropping material) was added by dropping at constant velocity for 2 hours from the dropping funnel.

After the dropping, the mixture was kept to the temperature of 140° C. for 1 hour and the reaction temperature was decreased to 110° C. And then, the solution of polymerization initiator of composition shown in Table 5 (adding catalyst) was added to the mixture. The mixture was kept at 110° C. for 2 hours. The reaction was finished and solutions of modified resin F'-1 and F'-2 having nonvolatile matter shown in Table 5 were obtained.

TABLE 5

|  |  | Preparation Examples | |
|---|---|---|---|
|  |  | 8 | 9 |
| Kind of modified resin of ingredient (F') |  | F'-1 | F'-2 |
| Initial charge (part by weight) | Xylene | 60 | 60 |
|  | METHYL SILICATE 51[1] | 10 | 15 |
| Dropping material (part by weight) | Glycidyl methacrylate | 24 | 18 |
|  | n-butyl acrylate | 30 | 18 |
|  | Methyl methacrylate | 32 | 25 |
|  | 2-hydroxyethyl methacrylate | 4 | 4 |
|  | 2-methoxyethyl acrylate | — | 20 |
|  | t-butylperoxy-2-ethylhexanoate | 2 | 2 |
| Adding catalyst (part by weight) | t-butylperoxy-2-ethylhexanoate | 0.2 | 0.2 |
|  | Xylene | 4.5 | 4.5 |
| Nonvolatile matter (percent by weight) |  | 59.7 | 60.2 |

The materials of the superior in the Table are the followings.
[1)] condensate of organosilicate (trade name, a product of CORCOAT Co.)

Preparation of Curing Agent of Ingredient (B)

Preparation Example 10

Into a four-necked flask equipped with a thermometer, a reflux condenser, a stirrer and a dropping funnel, 134 parts by weight of trimethylol propane and 425.3 parts by weight of methyl isobutyl ketone were charged and the mixture was heated under stirring until the temperature reached to 120°

C. To the mixture kept at 120° C., 504 parts by weight of methylhexahydrophthalic anhydride were added by dropping for 2 hours and the mixture was kept under stirring and heating until acid value of the mixture decreased to a value of not more than 160. The acid value was measured by diluting the same sample to 50 times by weight with a mixture of pyridine and water (pyridine/water=9/1 (by weight)), heating for 30 minutes at 90° C. and titrating with a Standard solution of potassium hydroxide. Thus, solution of curing agent B-1 having nonvolatile matter of 60 percents by weight and carboxylic acid equivalent of 355 as the solution was obtained.

Examples 9 to 12

(1) Preparation of Clear Coating Composition

The clear coating compositions were prepared by mixing the raw materials of composition shown in Table 6.

TABLE 6

|  | Example | | | |
| --- | --- | --- | --- | --- |
|  | 9 | 10 | 11 | 12 |
| Formulation ratio (part by weight) | | | | |
| (F') solution of modified resin, F'-1[1)] | 100 | — | 100 | — |
| solution of modified resin, F'-2[2)] | — | 100 | — | 100 |
| (B) Solution of curing agent, B-1[3)] | 36 | — | — | 27 |
| Solution of curing agent, B-2[4)] | — | 65 | 87 | — |
| (C) Silicate, C-1[5)] | 20 | — | 14 | — |
| Silicate, C-2[6)] | — | 2 | — | 2 |
| Others | | | | |
| Hydrolysis catalyst[7)] | 2 | 2 | 2 | 2 |
| Curing catalyst[8)] | 2 | 2 | 2 | 2 |
| Solution of ultraviolet light absorbent[9)] | 7 | 9 | 9 | 7 |
| Solution of light stabilizer[10)] | 7 | 9 | 9 | 7 |
| Solution of surface controlling agent[11)] | 1.5 | 2 | 2 | 1.5 |
| SOLVESSO 100[12)] | 5 | 5 | 9 | 3 |

The materials of the superiors in the Table are the followings.
[1)]solution of modified resin of Preparation Example 8, F'-1
[2)]solution of modified resin of Preparation Example 9, F'-2
[3)]solution of curing agent of Preparation Example 10, B-1
[4)]solution of curing agent of Preparation Example 4, B-2
[5)]MKC-SILICATE MS56SB5 (trade name, a product of MITSUBISHI CHEMICAL CORPORATION, Mw 1500)
[6)]ETHYL SILICATE 40 (trade name, a product of TAMA CHEMICAL CO., LTD., Mw 750)
[7)]solution of 10 percents by weight of dibutyl tin dilaurate in xylene
[8)]solution of 10 percents by weight of tetrabutyl ammonium bromide in isobutyl acetate
[9)]solution of 20 percents by weight of TINUVIN 900 (trade name, a product of CHIBA SPECIALITY CHEMICALS Co.) in xylene
[10)]solution of 20 percents by weight of TINUVIN 292 (trade name, a product of CHIBA SPECIALITY CHEMICALS Co.) in xylene
[11)]solution of 10 percents by weight of BYK-300 (trade name, a product of BYK-Chemie Japan K.K.) in xylene
[12)]trade name, a product of ESSO Co., aromatic petroleum naphtha (2) Preparation of Test Pieces and Evaluation of Paint Film Properties Cationic electrodeposition coat AQUA No. 4200 (trade name, a product of NOF CORPORATION) was applied by electrodeposition to a soft steel plate treated with zinc phosphate in an amount to form a film having dried thickness of 20 μm and the coated plate was baked at 175° C. for 25 minutes. Intermediate coat HS-H300 (trade name, a product of NOF CORPORATION) was applied to the coated plate by air spraying in an amount to form a film having dried thickness of 30 μm and the plate was baked at 140° C. for 30 minutes. And further, solvent type black base coating composition, BELCOAT No. 6000 (trade name, a product of NOF CORPORATION) was applied to intermediate coat by air spraying in an amount to form a film having dried thickness of 15 μm. After the coated plate was set at 20° C. for 3 minutes, the coating composition prepared in above mentioned (1) was diluted with thinner (SOLVESSO 100/butyl acetate=9/1 of weight ratio) to a viscosity required for spraying (25 seconds at 20° C. by Ford cup No. 4) and was applied on the plate by air spraying in wet-on-wet coating method in an amount to form a film having dried thickness of 40 μm and the plates were baked at 140° C. for 30 minutes to obtain a test piece. In all cases of Examples 9 through 12, test pieces for stain resistance in outdoor exposure were coated with solvent type white base coating composition, BELCOAT No. 6000 (trade name, a product of NOF CORPORATION) instead of solvent type black base coating composition, BELCOAT No. 6000. In all cases, uniform paint films having good gloss were prepared. Results of the evaluation of paint film properties are shown in Table 7. All the paint films had excellent appearance of paint film, hydrophilic property, stain resistance in outdoor exposure, weathering resistance, water resistance and acid resistance.

Examples 13 and 14

Cationic electrodeposition coat AQUA No. 4200 (trade name, a product of NOF CORPORATION) was applied by electrodeposition to a soft steel plate treated with zinc phosphate in an amount to form a film having dried thickness of 20 μm and the coated plate was baked at 175° C. for 25 minutes. Intermediate coat HS-H300 (trade name, a product of NOF CORPORATION) was applied to the coated plate by air spraying in an amount to form a film having dried thickness of 30 μm and the plate was baked at 140° C. for 30 minutes. And further, solvent type black base coating composition, BELCOAT No. 6000 (trade name, a product of NOF CORPORATION) was applied to intermediate coat by air spraying in an amount to form a film having dried thickness of 15 μm. After the coated piece was set at 20° C. for 3 minutes, the following under clear coating composition was applied on the plate by air spraying in wet-on-wet coating method in an amount to form a film having dried thickness of 40 μm and the plate was baked at 140° C. for 30 minutes. Further, the clear coating composition prepared in Example 9 was applied on the plate obtained by the above method as over coat coating application in Example 13 and the clear coating composition prepared in Example 10 was applied on the plate obtained by the above method as over coat coating application in Example 14, and the plates were baked at 140° C. for 30 minutes to obtain test pieces. In both of Examples 13 and 14, test plates for stain resistance in outdoor exposure was coated with solvent type white base coating composition, BELCOAT No.6000 (trade name, a product of NOF CORPORATION) instead of solvent type black base coating composition, BELCOAT No. 6000. Results of the evaluation of paint film properties are shown in Table 7. In all cases, uniform paint films having good gloss were prepared. All the paint films had excellent appearance of paint film, hydrophilic property, stain resistance in outdoor exposure, weathering resistance, water resistance and acid resistance.

Preparation of Under Clear Coating Composition

Into a four-necked flask equipped with a thermometer, a reflux condenser, a stirrer and a dropping funnel, 60 parts by weight of xylene were charged and heated under stirring until the temperature reached to 140° C. To the solvent kept at 140° C., a mixture of 8 parts by weight of glycidyl methacrylate, 77 parts by weight of butyl methacrylate, 15 parts by weight of 2-hydroxyethyl methacrylate and 2 parts by weight of t-butylperoxy-2-ethylhexanoate were added by dropping at constant velocity for 2 hours from the dropping funnel.

After the dropping, the mixture was kept to the temperature of 140° C. for 1 hour and the reaction temperature was decreased to 110° C. And then, 0.2 parts by weight of t-butylperoxy-2-ethylhexanoate and 4.5 parts by weight of xylene were added to the mixture. The mixture was kept at 110° C. for 2 hours. The reaction was finished and solution of acrylic resin U-1 for under clear coating composition having nonvolatile matter of 60.9 percents by weight was obtained.

Next, the following raw materials including the solution of acrylic resin prepared above were mixed to prepare the under clear coating composition.

| | |
|---|---|
| solution of acrylic resin prepared above, U-1 | 100 parts by weight |
| U-VAN 20SE-60 (a product of MITSUI CHEMICALS INC., solution of melamine resin, nonvolatile matter of 60 percents by weight) | 50 parts by weight |
| SUMIDUR BL-3175 (a product of SUMITOMO BAYER URETHANE Co., solution of blocked polyisocyanate compound of trimer of hexamethylene diisocyanate, nonvolatile matter of 75 percents by weight) | 13.3 parts by weight |
| Xylene solution of 20 percents by weight of TINUVIN 900 | 5 parts by weight |
| Xylene solution of 20 percents by weight of TINUVIN 292 | 5 parts by weight |
| Xylene solution of 20 percents by weight of BYK-300 | 0.5 parts by weight |
| 2-ethylhexyl phosphate | 0.5 parts by weight |
| Xylene solution of 20 percents by weight of dibutyl tin dilaurate | 2.5 parts by weight |
| SOLVESSO 100 | 5 parts by weight |

The under clear coating composition prepared above was diluted with thinner (SOLVESSO 100/n-butanol=9/1 of weight ratio) to a viscosity required for spraying (25 seconds at 20° C. by Ford cup No. 4).

Examples 15 and 16

Cationic electrodeposition coat AQUA No. 4200 (trade name, a product of NOF CORPORATION) was applied by electrodeposition to a soft steel plate treated with zinc phosphate in an amount to form a film having dried thickness of 20 μm and the coated plate was baked at 175° C. for 25 minutes. Intermediate coat HS-H300 (trade name, a product of NOF CORPORATION) was applied to the coated plate by air spraying in an amount to form a film having dried thickness of 30 μm and the plate was baked at 140° C. for 30 minutes. And further, aqueous type black base coat AQUA BC-3 (trade name, a product of NOF CORPORATION) was applied to intermediate coat by air spraying in an amount to form a film having dried thickness of 15 μm. After the coated plate was set at 20° C. for 3 minutes and dried at 80° C. for 10 minutes, the plate was allowed to stand and cooled until room temperature. Each of the under clear coating compositions described in Examples 13 and 14 was applied on each of the plates by air spraying in an amount to form a film having dried thickness of 40 μm and the plates were baked at 140° C. for 30 minutes. Further, the clear coating composition prepared in Example 11 was applied on the plate obtained by the above method as over coat coating application in Example 15 and the clear coating composition prepared in Example 12 was applied on the plate obtained by the above method as over coat coating application in Example 16, in an amount to form a film having dried thickness of 40 μm and the plates were baked at 140° C. for 30 minutes to obtain test pieces. In Examples 15 and 16, test pieces for stain resistance in outdoor exposure was coated with aqueous type white base coat AQUA BC-3 (trade name, a product of NOF CORPORATION) instead of aqueous type black base coat AQUA BC-3 (trade name, a product of NOF CORPORATION). Results of the evaluation of paint film properties are shown in Table 7. In all cases, uniform paint films having good gloss were prepared. All the paint films had excellent appearance of paint film, hydrophilic property, stain resistance in outdoor exposure, weathering resistance, water resistance and acid resistance.

TABLE 7

| | | Example | | | | | | | |
|---|---|---|---|---|---|---|---|---|---|
| | | 9 | 10 | 11 | 12 | 13 | 14 | 15 | 16 |
| Formulation ratio[1] (part by weight) | | | | | | | | | |
| Modified resin (F') | F'-1 | 59.0 | — | 51.1 | — | 59.0 | — | 51.1 | — |
| | F'-2 | — | 63.5 | — | 76.7 | — | 63.5 | — | 76.7 |
| Curing agent (B) | B-1 | 21.3 | — | — | — | 20.7 | 21.3 | — | 20.7 |
| | B-2 | — | 34.5 | 37.0 | — | — | 34.5 | 37.0 | — |
| Silicate (C) | C-1 | 19.7 | — | 11.9 | — | 19.7 | — | 11.9 | — |
| | C-2 | — | 2 | — | 2.6 | — | 2 | — | 2.6 |
| Base coat | | Solvent type | Solvent type | Solvent type | Solvent type | Solvent type | Solvent type | Aqueous type | Aqueous type |
| Paint film structure | | 2C1B[2] | 2C1B[2] | 2C1B[2] | 2C1B[2] | OB[3] | OB[3] | OB[3] | OB[3] |
| Paint properties | | | | | | | | | |
| Finish appearance | | ○ | ○ | ○ | ○ | ○ | ○ | ○ | ○ |

TABLE 7-continued

| | Example | | | | | | | |
|---|---|---|---|---|---|---|---|---|
| | 9 | 10 | 11 | 12 | 13 | 14 | 15 | 16 |
| Formulation ratio[1] (part by weight) | | | | | | | | |
| Contact angle of water | 32° | 28° | 30° | 30° | 33° | 24° | 32° | 26° |
| Stain resistance in outdoor exposure [ΔL value] | −1.3 | −1.1 | −1.2 | −1.4 | −1.3 | −1.1 | −1.2 | −1.3 |
| Weathering resistance | Non abnormal | Non abnormal | Non abnormal | Non abnormal | Non abnormal | Non abnormal | Non abnormal | Non abnormal |
| Water resistance | Non abnormal | Non abnormal | Non abnormal | Non abnormal | Non abnormal | Non abnormal | Non abnormal | Non abnormal |
| Acid resistance | Non abnormal | Non abnormal | Non abnormal | Non abnormal | Non abnormal | Non abnormal | Non abnormal | Non abnormal |

The materials of the superior in the Table are the followings.
[1] formulation ratio of nonvolatile matters
[2] 2C1B: two coat-one bake paint film
[3] OB: application of the over coat clear coating composition on the two coat-one bake paint film Comparative Example 3

(1) Preparation of Clear Coating Composition

The clear coating composition was prepared by mixing the raw materials of composition shown in Table 8.

TABLE 8

| | Comparative Example 3 |
|---|---|
| Formulation ratio[1] (parts by weight) | |
| (B) Solution of curing agent B-1[2] | 52 |
| (C) Silicate C-1[3] | 28 |
| (D) Solution of acrylic resin D-1[4] | 100 |
| Others | |
| Hydrolysis catalyst[5] | 2 |
| Curing catalyst[6] | 2 |
| Solution of ultraviolet light absorbent[7] | 8 |
| Solution of light stabilizer[8] | 8 |
| Solution of surface controlling agent[9] | 2 |
| SOLVESSO 100[10] | 14 |

The materials of the superiors in the Table are the following.
[1]–[3] the same components as described above
[4] solution of an epoxy roup-containing acrylic resin D-1 prepared above
[5]–[10] the same components as described above (2) Preparation of Test Pieces and Evaluation of Paint Film Properties Cationic electrodeposition coat AQUA No. 4200 (trade name, a product of NOF CORPORATION) was applied by electrodeposition to a soft steel plate treated with zinc phosphate in an amount to form a film having dried thickness of 20 μm and the coated plate was baked at 175° C. for 25 minutes. Intermediate coat HS-H300 (trade name, a product of NOF CORPORATION) was applied to the prepared plate by air spraying in an amount to form a film having dried thickness of 30 μm and the plate was baked at 140° C. for 30 minutes. And further, a black base coating composition, BELCOAT No. 6000 (trade name, a product of NOF CORPORATION) was applied to intermediate coat by air spraying in an amount to form a film having dried thickness of 15 μm. After the coated piece was set at 20° C. for 3 minutes, the coating composition prepared in above mentioned (1) was diluted with thinner (SOLVESSO 100/ butyl acetate=9/1 of weight ratio) to a viscosity required for spraying (25 seconds at 20° C. by Ford cup No. 4) and was applied on the plate by air spraying in wet-on-wet coating method in an amount to form a film having dried thickness of 40 μm and the plate was baked at 140° C. for 30 minutes to a test piece. The test piece for stain resistance in outdoor exposure was coated with solvent type white base coating composition, BELCOAT No. 6000 (trade name, a product of NOF CORPORATION) instead of solvent type black base coating composition, BELCOAT No. 6000. Results of the evaluation of paint film properties are shown in Table 9. In Comparative Example 3, modified resin of ingredient (F') was not contained and therefore, weathering resistance and water resistance were inferior.

TABLE 9

| | Comparative Example 3 |
|---|---|
| Formulation ratio (part by weight) | |
| Curing agent (B) B-1 | 26.2 |
| Silicate (C) C-1 | 23.5 |
| Acrylic resin D-1 | 50.3 |
| Base coat | Solvent type |
| Paint film structure | 2C1B |
| Paint film properties | |
| Finish appearance | ○ |
| Contact angle of water | 43° |
| Stain resistance in outdoor exposure [ΔL value] | −2.7 |
| Weathering resistance | Decrease of gloss |
| Water resistance | Generation of blushing |
| Acid resistance | Non abnormal |

The stain resistant coating composition of the present invention can give cured materials having stain resistance based on high degree of hydrophilic property immediately after formation of paint film and further excellent weathering resistance for a long time, water resistance and chemical resistance.

The invention claimed is:

1. A stain resistant coating composition, which comprises: from 3 to 80 percent by weight of (F') a modified resin having an organosilicate structure part and an acrylic resin structure part that is prepared by polymerizing a mixture of polymerizable monomers for constructing the acrylic resin structure part in the presence of a non-radical polymerizable organosilicate for constructing the organosilicate structure part, wherein the mixture of polymerizable monomers for constructing the acrylic resin structure part includes (i) one or more hydroxyl group-containing radical polymerizable monomers, (ii) one or more epoxy group-containing radical polymerizable monomers and (iii) a radical polymerizable monomer having one or more organic groups represented by the formula (3):

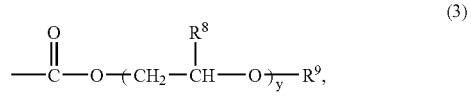

wherein $R^8$ is hydrogen atom or an alkyl group having 1 to 4 carbon atoms, $R^9$ is an alkyl group having 1 to 4 carbon atoms and y is an integer from 1 to 10, wherein the content of the (i) hydroxyl group-containing radical polymerizable monomers is from 1 to 15 percent by weight of all monomers for constructing the acrylic resin structure part, wherein the content of the (ii) epoxy group-containing radical polymerizable monomers is from 5 to 60 percent by weight of all monomers for constructing the acrylic resin structure part, wherein the content of the (iii) radical polymerizable monomer having one or more organic groups represented by the formula (3) is from 1 to 40 percent by weight of all monomers for constructing the acrylic resin structure part, and wherein the non-radical polymerizable organosilicate is represented by formula (2):

wherein $R^3$ and $R^4$ are each hydrogen atom, an alkyl group having 1 to 10 carbon atoms or an aryl group having 1 to 10 carbon atoms and n is 0 or 1, and/or a condensate thereof, and from 3 to 80 percents by weight of (B) a compound having in the molecule at least one functional group selected from the group consisting of a carboxyl group, a carboxylic acid anhydride group and a carboxyl group blocked with an alkylvinyl ether compound, and from 0.1 to 30 percents by weight of (C) an organosilicate represented by formula (1):

wherein $R^1$ and $R^2$ are each hydrogen atom, an alkyl group having 1 to 10 carbon atoms or an aryl group having 1 to 10 carbon atoms and m is 0 or 1, and/or a condensate thereof.

2. A method of coating which comprises applying a top coating composition comprising a pigment and the stain resistant coating composition as claimed in claim 1 on a coated article, wherein the content of the pigment is in the range from 0 to 200 parts by weight based on 100 parts by weight of all nonvolatile matters of ingredients (F'), (B) and (C).

3. A method of coating a substrate with a multilayer paint film which comprises applying a colored film forming composition on the substrate to form a base coat, followed by applying a clear film forming composition on the base coat to form a clear top coat, wherein the top coat clear film forming composition alone or both of the top coat clear film forming composition and the colored film forming composition comprises the coating composition as claimed in claim 1.

4. A coated article obtained by the method of coating as claimed in claim 3.

5. A method of coating which comprises applying a colored base coating composition on a substrate, followed by applying an under clear coating composition on the uncured base coat, and baking the base coat and the under clear coat, and then applying an over coat clear coating composition on the under clear coat and baking the over clear coat, wherein the under clear coating composition is selected from the group consisting of an acrylic resin/aminoplast resin coating composition, an acrylic resin/urethane resin hardener coating composition and an acrylic resin/aminoplast resin/urethane resin hardener coating composition, and the over coat clear coating composition comprises the coating composition as claimed in claim 1.

6. The method of coating as claimed in claim 5, which comprises applying a colored base coating composition on a substrate, followed by applying an under clear coating composition on the uncured base coat, and baking the base coat and the under clear coat, and then applying an over coat clear coating composition on the under clear coat and baking the over clear coat, wherein the under clear coating composition comprises a resin mixture of 40 to 80 percents by weight of (a) a hydroxyl group-containing and epoxy group-containing acrylic resin, 0 to 60 percents by weight of (b) an aminoplast resin and 0 to 60 percents by weight of (c) a urethane resin hardener as main component.

7. A coated article obtained by the method of coating as claimed in claim 1.

8. The stain resistant coating composition as claimed in claim 1, wherein the mixture of polymerizable monomers for constructing the acrylic resin structure part further comprises (iii) one or more additional polymerizable monomers selected from the group consisting of methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, hexyl methacrylate, cyclohexyl methacrylate, 2-ethylhexyl methacrylate, octyl methacrylate, lauryl methacrylate, stearyl methacrylate, styrene, acrylonitrile, methacrylonitrile, acrylamide, methacrylamide, acrylic acid, methacrylic acid, itaconic acid, methaconic acid, maleic acid and fumaric acid.

9. The stain resistant coating composition as claimed in claim 1, wherein the non-radical polymerizable organosilicate is one selected from the group consisting of tetrahydrosilane, tetramethoxysilane, tetraethoxysilane, tetrapropoxysilane, tetrabutoxysilane, tetraphenoxysilane, dimethoxydiethoxysilane, methyltrimethoxysilane, methyltriethoxysilane, phenyltrimethoxysilane, phenyltriethoxysilane, butyltrimethoxysilane, hexyltrimethoxysilane, decyltrimethoxysilane, ethoxytrimethoxysilane, propoxytrimethoxysilane and butoxytrimethoxysilane, and condensates thereof.

* * * * *